(12) United States Patent
Yao et al.

(10) Patent No.: US 12,443,010 B2
(45) Date of Patent: Oct. 14, 2025

(54) OPTICAL LENS ASSEMBLY AND IMAGING DEVICE INCLUDING SEVEN LENSES OF ---++-+ or ---+-++ REFRACTIVE POWERS

(71) Applicant: NINGBO SUNNY AUTOMOTIVE OPTECH CO., LTD., Ningbo (CN)

(72) Inventors: Bo Yao, Ningbo (CN); Dongfang Wang, Ningbo (CN); Xiaoyu Luan, Ningbo (CN)

(73) Assignee: NINGBO SUNNY AUTOMOTIVE OPTECH CO., LTD., Ningbo (CN)

( * ) Notice: Subject to any disclaimer, the term of this patent is extended or adjusted under 35 U.S.C. 154(b) by 18 days.

(21) Appl. No.: 18/306,290

(22) Filed: Apr. 25, 2023

(65) Prior Publication Data

US 2023/0258908 A1    Aug. 17, 2023

Related U.S. Application Data

(63) Continuation of application No. 16/730,349, filed on Dec. 30, 2019, now abandoned, which is a (Continued)

(30) Foreign Application Priority Data

Apr. 28, 2018 (CN) .......................... 201810397674.8
Apr. 28, 2018 (CN) .......................... 201810403955.X
(Continued)

(51) Int. Cl.
G02B 9/64 (2006.01)
G02B 13/00 (2006.01)

(52) U.S. Cl.
CPC ........... *G02B 9/64* (2013.01); *G02B 13/0045* (2013.01); *G02B 13/006* (2013.01)

(58) Field of Classification Search
CPC ............................. G02B 9/64; G02B 13/0045
See application file for complete search history.

(56) References Cited

U.S. PATENT DOCUMENTS

2018/0039049 A1    2/2018 Lee
2018/0157007 A1*   6/2018 Kim .......................... G02B 9/64
(Continued)

FOREIGN PATENT DOCUMENTS

CN    1176401 A    3/1998
CN    1735830 A    2/2006
(Continued)

*Primary Examiner* — Wen Huang
(74) *Attorney, Agent, or Firm* — HAUPTMAN HAM, LLP

(57) ABSTRACT

The present disclosure discloses an optical lens assembly and an imaging device including the same. The optical lens assembly includes seven lenses, wherein a first lens has a negative refractive power, an object-side surface thereof is a convex surface, and an image-side surface thereof is a concave surface; a second lens has a negative refractive power, and an image-side surface thereof is a concave surface; a third lens has a negative refractive power; a fourth lens has a positive refractive power, and an object-side surface thereof is a convex surface; an object-side surface of a fifth lens is a convex surface; a seventh lens has a positive refractive power, and an object-side surface thereof is a convex surface; and the fifth lens and the sixth lens are cemented to form a cemented lens.

18 Claims, 6 Drawing Sheets

Related U.S. Application Data continuation of application No. PCT/CN2019/082155, filed on Apr. 11, 2019.

(30) Foreign Application Priority Data

Jul. 27, 2018 (CN) .......................... 201810840869.5
Dec. 25, 2018 (CN) .......................... 201811588530.7

(56) References Cited

U.S. PATENT DOCUMENTS

2019/0187443 A1* 6/2019 Jia .......................... G02B 13/06
2019/0324232 A1  10/2019 Yang

FOREIGN PATENT DOCUMENTS

| | | |
|---|---|---|
| CN | 102388331 A | 3/2012 |
| CN | 104793316 A | 7/2015 |
| CN | 106324797 A | 1/2017 |
| CN | 106990509 A | 7/2017 |
| CN | 206920686 A | 1/2018 |
| CN | 207074298 U | 3/2018 |
| CN | 208092317 U | 11/2018 |
| JP | 2006337691 A | 12/2006 |
| JP | 2008-134494 A | 6/2008 |
| JP | 2017-125978 A | 7/2017 |
| WO | WO-2018006592 A1 * | 1/2018 ............. G02B 13/04 |

\* cited by examiner

OPTICAL LENS ASSEMBLY AND IMAGING DEVICE INCLUDING SEVEN LENSES OF ---++-+ or ---+-++ REFRACTIVE POWERS

CROSS-REFERENCE TO RELATED APPLICATIONS

This application is a U.S. continuation of U.S. Non-Provisional patent application Ser. No. 16/730,349 filed on Dec. 30, 2019, which is a continuation of International Application No. PCT/CN2019/082155, filed on Apr. 11, 2019, which claims priority to Chinese Patent Application No. 201810403955.X entitled "Optical Lens Assembly" filed on Apr. 28, 2018 in the China National Intellectual Property Administration, Chinese Patent Application No. 201810397674.8 entitled "Optical Lens Assembly" filed on Apr. 28, 2018 in the China National Intellectual Property Administration, Chinese Patent Application No. 201810840869.5 entitled "Optical Lens Assembly" filed on Jul. 27, 2018 in the China National Intellectual Property Administration, and Chinese Patent Application No. 201811588530.7 entitled "Optical Lens Assembly and Imaging Device" filed on Dec. 25, 2018 in the China National Intellectual Property Administration. All of the aforementioned patent applications are hereby incorporated by reference in their entireties.

TECHNICAL FIELD

The present disclosure relates to an optical lens assembly, and more specifically, the present disclosure relates to an optical lens assembly including seven lenses. Furthermore, the present disclosure also relates to an imaging device including an optical lens assembly having seven lenses.

BACKGROUND

Due to the rapid development of driver assistance systems in recent years, optical lens assemblies have been more and more widely used on vehicles. Meanwhile, it has put forward higher and higher requirements on pixels of optical lens assemblies. More and more companies are using wide-angle lens assemblies for autonomous driving.

In current automotive industry, on-board lens assemblies are required to be miniaturized and low cost, but have a high resolution. Since the driving environment of a vehicle is relatively variable, lens assemblies mounted outside the vehicle shall be capable of maintaining the high resolution in various harsh environments. As large-size, high-pixel chips are gradually used, the original pixels of on-board lens assemblies may no longer match these chips, and thus it is desirable to develop new higher-pixel lens assemblies to replace existing low-pixel lens assemblies on the market. Conventionally, to achieve a higher pixel of the lens assembly, it is necessary to increase the number of lenses or employ aspherical lenses, which however conflicts with the two requirements of low cost and miniaturization of the lens assemblies.

With the popularization of optical lens assemblies, on-board lens assemblies, which have high-definition imaging and are capable of obtaining comfortable picture, are increasingly required on the market. To achieve megapixel resolution, the wide-angle lens assemblies currently in use are such wide-angle lens assemblies that usually use aspheric surfaces to correct aberrations including chromatic aberrations, and have increased number of lenses (up to more than six). However, these approaches correspondingly increase the size and weight of the lens assembly, which is disadvantageous to make the lens assembly miniaturized, and at the same time will cause an increased cost.

At present, more plastic lenses are used to reduce costs and reduce weight. However, due to the thermal expansion and contraction properties, it is still difficult for the plastic lenses with high degree of plasticization to meet the increasingly stringent temperature requirements even if their temperature performance is better achieved through a proper selection of refractive powers and materials of the lenses. Of course, glass aspherical lenses may also be used to improve imaging quality and meet temperature performance requirements. However, the manufacturing process of glass aspheric surface is difficult and the cost thereof is also high.

In order to avoid a sharp increase of costs, the above objectives have been generally achieved by adding plastic lenses. However, due to the limitation of the nature of the plastic material, the large number of plastic lenses will prevent the on-board lens assembly from maintaining high resolution in a high or a low temperature environment.

SUMMARY

The present disclosure provides an optical lens assembly that is applicable to on-board installation and at least overcomes or partially overcomes at least one of the above deficiencies of the prior art.

In a first aspect, the present disclosure provides an optical lens assembly which may include a first lens, a second lens, a third lens, a fourth lens, a fifth lens, a sixth lens and a seventh lens, sequentially from an object side to an image side along an optical axis. The first lens may have a negative refractive power, an object-side surface thereof is a convex surface, and an image-side surface thereof is a concave surface. The second lens may have a negative refractive power, an object-side surface thereof is a convex surface, and an image-side surface thereof is a concave surface. The third lens may have a negative refractive power, and both of an object-side surface and an image-side surface of the third lens are concave surfaces. The fourth lens may have a positive refractive power, and an object-side surface of the fourth lens is a convex surface. The seventh lens may have a positive refractive power, and both of an object-side surface and an image-side surface of the seventh lens are convex surfaces. The fifth lens and the sixth lens may be cemented to form a cemented lens.

In one embodiment, an image-side surface of the fourth lens may be a convex surface.

In another embodiment, an image-side surface of the fourth lens may be a concave surface.

In one embodiment, the fifth lens may have a positive refractive power, and both of an object-side surface and an image-side surface of the fifth lens may be convex surfaces.

In one embodiment, the sixth lens may have a negative refractive power, and both of an object-side surface and an image-side surface of the sixth lens may be concave surfaces.

In one embodiment, a refractive index of a material of the first lens may be equal to or greater than 1.65.

In one embodiment, at least three lenses of the optical lens assembly may be aspherical lenses.

In one embodiment, the seventh lens may be an aspherical lens.

In one embodiment, at least one lens of the optical lens assembly may be a glass lens.

In one embodiment, the optical lens assembly may satisfy: $D/h/FOV \leq 0.025$, where FOV is a maximum field-ofview of the optical lens assembly; D is a maximum effective aperture radius of the object-side surface of the first lens corresponding to the maximum field-of-view of the optical lens assembly; and h is an image height corresponding to the maximum field-of-view of the optical lens assembly.

In one embodiment, the optical lens assembly may satisfy: D/2h/FOV≤0.025, where FOV is a maximum field-of-view of the optical lens assembly; D is a maximum effective aperture of the object-side surface of the first lens corresponding to the maximum field-of-view of the optical lens assembly; and 2h is an image height corresponding to the maximum field-of-view of the optical lens assembly.

In one embodiment, the optical lens assembly may satisfy: TTL/2h/FOV≤0.025, where TTL is a distance on the optical axis from a center of the object-side surface of the first lens to an imaging plane of the optical lens assembly; 2h is an image height corresponding to a maximum field-of-view of the optical lens assembly; and FOV is the maximum field-of-view of the optical lens assembly.

In one embodiment, the optical lens assembly may satisfy: BFL/TTL≥0.1, where BFL is a distance on the optical axis from a center of the image-side surface of the seventh lens to an imaging plane of the optical lens assembly; and TTL is a distance on the optical axis from a center of the object-side surface of the first lens to the imaging plane of the optical lens assembly.

In one embodiment, a radius of curvature r31 of the object-side surface of the third lens, a radius of curvature r32 of the image-side surface of the third lens and a center thickness d3 of the third lens may satisfy: (|r31|+d3)/|r32|≤12.

In a second aspect, the present disclosure provides an optical lens assembly which may include a first lens, a second lens, a third lens, a fourth lens, a fifth lens, a sixth lens and a seventh lens, sequentially from an object side to an image side along an optical axis. Each of the first lens, the second lens, the third lens and the sixth lens may have a negative refractive power. Each of the fourth lens, the fifth lens and the seventh lens may have a positive refractive power. The fifth lens and the sixth lens may be cemented to form a cemented lens. The optical lens assembly may satisfy: TTL/2h/FOV≤0.025, where TTL is a distance on the optical axis from a center of an object-side surface of the first lens to an imaging plane of the optical lens assembly; 2h is an image height corresponding to a maximum field-of-view of the optical lens assembly; and FOV is the maximum field-of-view of the optical lens assembly.

In one embodiment, the object-side surface of the first lens may be a convex surface, and an image-side surface of the first lens may be a concave surface.

In one embodiment, an object-side surface of the second lens may be a convex surface, and an image-side surface of the second lens may be a concave surface.

In one embodiment, both of an object-side surface and an image-side surface of the third lens may be concave surfaces.

In one embodiment, both of an object-side surface and an image-side surface of the fourth lens may be convex surfaces.

In another embodiment, an object-side surface of the fourth lens may be a convex surface, and an image-side surface of the fourth lens may be a concave surface.

In one embodiment, both of an object-side surface and an image-side surface of the fifth lens may be convex surfaces.

In one embodiment, both of an object-side surface and an image-side surface of the sixth lens may be concave surfaces.

In one embodiment, both of an object-side surface and an image-side surface of the seventh lens may be convex surfaces.

In one embodiment, a refractive index of a material of the first lens may be equal to or greater than 1.65.

In one embodiment, at least three lenses of the optical lens assembly may be aspherical lenses.

In one embodiment, the seventh lens may be an aspherical lens.

In one embodiment, at least one lens of the optical lens assembly may be a glass lens.

In one embodiment, the optical lens assembly may satisfy: D/2h/FOV≤0.025, where FOV is a maximum field-of-view of the optical lens assembly; D is a maximum effective aperture of the object-side surface of the first lens corresponding to the maximum field-of-view of the optical lens assembly; and 2h is an image height corresponding to the maximum field-of-view of the optical lens assembly.

In one embodiment, the optical lens assembly may satisfy: BFL/TTL≥0.1, where BFL is a distance on the optical axis from a center of an image-side surface of the seventh lens to the imaging plane of the optical lens assembly; and TTL is the distance on the optical axis from the center of the object-side surface of the first lens to the imaging plane of the optical lens assembly.

In one embodiment, a radius of curvature r31 of an object-side surface of the third lens, a radius of curvature r32 of an image-side surface of the third lens and a center thickness d3 of the third lens may satisfy: (|r31|+d3)/|r32|≤12.

In a third aspect, the present disclosure provides an optical lens assembly including a first lens, a second lens, a third lens, a fourth lens, a fifth lens, a sixth lens and a seventh lens, sequentially from an object side to an image side along an optical axis. The first lens has a negative refractive power, an object-side surface of the first lens is a convex surface, and an image-side surface of the first lens is a concave surface. The second lens has a negative refractive power, an object-side surface of the second lens is a convex surface, and an image-side surface of the second lens is a concave surface. The third lens has a negative refractive power, an object-side surface of the third lens is a concave surface, and an image-side surface of the third lens is a convex surface. The fourth lens has a positive refractive power, an object-side surface of the fourth lens is a convex surface, and an image-side surface of the fourth lens is a concave surface. The fifth lens and the sixth lens are cemented together. The seventh lens has a positive refractive power, and both of an object-side surface and an image-side surface of the seventh lens are convex surfaces.

In some alternative embodiments, the fifth lens has a positive refractive power, and both of an object-side surface and an image-side surface of the fifth lens are convex surfaces; and the sixth lens has a negative refractive power, and both of an object-side surface and an image-side surface of the sixth lens are concave surfaces.

In some alternative embodiments, the second lens, the third lens, and the seventh lens are aspherical lenses.

In some alternative embodiments, at least four lenses among the first lens, the second lens, the third lens, the fourth lens, the fifth lens, the sixth lens and the seventh lens are aspherical lenses.

In some alternative embodiments, the fourth lens of the optical lens assembly satisfies: 0.4≤(|r41|+d4)/|r42|≤0.8, where r41 is a radius of curvature of the object-side surface of the fourth lens of the optical lens assembly; d4 is a center thickness of the fourth lens of the optical lens assembly; and r42 is a radius of curvature of the image-side surface of the fourth lens of the optical lens assembly.

In some alternative embodiments, the optical lens assembly satisfies: D/2h/FOV≤0.02, where D is a maximum effective aperture-radius of the object-side surface of the first lens corresponding to a maximum field-of-view of the optical lens assembly; 2h is an image height corresponding to the maximum field-of-view of the optical lens assembly; and FOV is the maximum field-of-view of the optical lens assembly.

In some alternative embodiments, the optical lens assembly satisfies: TTL/2h/FOV≤0.025, where TTL is a distance on the optical axis from a center of the object-side surface of the first lens to an imaging plane of the optical lens assembly; 2h is an image height corresponding to a maximum field-of-view of the optical lens assembly; and FOV is the maximum field-of-view of the optical lens assembly.

In some alternative embodiments, the optical lens assembly satisfies: BFL/TTL≥0.1, where BFL is a distance on the optical axis from a center of the image-side surface of the seventh lens to an imaging plane of the optical lens assembly; and TTL is a distance on the optical axis from a center of the object-side surface of the first lens to the imaging plane of the optical lens assembly.

In some alternative embodiments, the first lens of the optical lens assembly satisfies: Nd1≥1.7, where Nd1 is a refractive index of a material forming the first lens of the optical lens assembly.

In a fourth aspect, the present disclosure provides an optical lens assembly including a first lens, a second lens, a third lens, a fourth lens, a fifth lens, a sixth lens and a seventh lens, sequentially from an object side to an image side along an optical axis. Each of the first lens, the second lens and the third lens has a negative refractive power. Each of the fourth lens and the seventh lens has a positive refractive power. The optical lens assembly satisfies: TTL/2h/FOV≤0.025, where TTL is a distance on the optical axis from a center of an object-side surface of the first lens to an imaging plane of the optical lens assembly; 2h is an image height corresponding to a maximum field-of-view of the optical lens assembly; and FOV is the maximum field-of-view of the optical lens assembly.

In some alternative embodiments, an object-side surface of the first lens is a convex surface, and an image-side surface of the first lens is a concave surface.

In some alternative embodiments, an object-side surface of the second lens is a convex surface, and an image-side surface of the second lens is a concave surface.

In some alternative embodiments, an object-side surface of the third lens is a concave surface, and an image-side surface of the third lens is a convex surface.

In some alternative embodiments, an object-side surface of the fourth lens is a convex surface, and an image-side surface of the fourth lens is a concave surface.

In some alternative embodiments, the fifth lens and the sixth lens are cemented together.

In some alternative embodiments, both of an object-side surface and an image-side surface of the seventh lens are convex surfaces.

In some alternative embodiments, the fifth lens has a positive refractive power, and both of an object-side surface and an image-side surface of the fifth lens are convex surfaces; and the sixth lens has a negative refractive power, and both of an object-side surface and an image-side surface of the sixth lens are concave surfaces.

In some alternative embodiments, the second lens, the third lens, and the seventh lens are aspherical lenses.

In some alternative embodiments, at least four lenses among the first lens, the second lens, the third lens, the fourth lens, the fifth lens, the sixth lens and the seventh lens are aspherical lenses.

In some alternative embodiments, the fourth lens of the optical lens assembly satisfies: 0.4≤(|r41|+d4)/|r42|≤0.8, where r41 is a radius of curvature of an object-side surface of the fourth lens of the optical lens assembly; d4 is a center thickness of the fourth lens of the optical lens assembly; and r42 is a radius of curvature of an image-side surface of the fourth lens of the optical lens assembly.

In some alternative embodiments, the optical lens assembly satisfies: D/2h/FOV≤0.02, where D is a maximum effective aperture of an object-side surface of the first lens corresponding to a maximum field-of-view of the optical lens assembly; 2h is an image height corresponding to the maximum field-of-view of the optical lens assembly; and FOV is the maximum field-of-view of the optical lens assembly.

In some alternative embodiments, the optical lens assembly satisfies: BFL/TTL≥0.1, where BFL is a distance on the optical axis from a center of an image-side surface of the seventh lens to an imaging plane of the optical lens assembly; and TTL is a distance on the optical axis from a center of an object-side surface of the first lens to the imaging plane of the optical lens assembly.

In some alternative embodiments, the first lens of the optical lens assembly satisfies: Nd1≥1.7, where Nd1 is a refractive index of a material forming the first lens of the optical lens assembly.

In a fifth aspect, the present disclosure provides an optical lens assembly which may include a first lens, a second lens, a third lens, a fourth lens, a fifth lens, a sixth lens and a seventh lens, sequentially from an object side to an image side along an optical axis. The first lens may have a negative refractive power, an object-side surface thereof is a convex surface, and an image-side surface thereof is a concave surface. The second lens may have a negative refractive power, and an image-side surface of the second lens is a concave surface. The third lens may have a negative refractive power, an object-side surface of the third lens is a concave surface, and an image-side surface of the third lens is a convex surface. The fourth lens may have a positive refractive power, and both of an object-side surface and an image-side surface of the fourth lens are convex surfaces. The fifth lens may have a negative refractive power, an object-side surface of the fifth lens is a convex surface, and an image-side surface of the fifth lens is a concave surface. The sixth lens may have a positive refractive power, and both of an object-side surface and an image-side surface of the sixth lens are convex surfaces. The seventh lens may have a positive refractive power, and an object-side surface of the seventh lens is a convex surface.

In one embodiment, fifth lens and the sixth lens may be cemented together to form a cemented lens.

In one embodiment, an object-side surface of the second lens may be a convex surface.

In another embodiment, an object-side surface of the second lens may be a concave surface.

In one embodiment, an image-side surface of the seventh lens may be a convex surface.

In one embodiment, an image-side surface of the seventh lens may be a concave surface.

In one embodiment, the optical lens assembly may have at least four aspherical lenses.

In one embodiment, all of the second lens, the third lens and the seventh lens may be aspherical lenses.

In one embodiment, the optical lens assembly may satisfy: $d2/TTL \leq 0.2$, where d2 is an air interval between the first lens and the second lens; and TTL is a distance on the optical axis from a center of the object-side surface of the first lens to an imaging plane of the optical lens assembly.

In one embodiment, the optical lens assembly may satisfy: $(FOV \times F)/2h \geq 45$, where FOV is a maximum field-of-view of the optical lens assembly; F is a total focal length of the optical lens assembly; and 2h is an image height corresponding to the maximum field-of-view of the optical lens assembly.

In one embodiment, a refractive index of a material of the first lens may be equal to or greater than 1.65.

In one embodiment, the optical lens assembly may satisfy: $D/2h/FOV \leq 0.02$, where FOV is a maximum field-of-view of the optical lens assembly; D is a maximum effective aperture of the object-side surface of the first lens corresponding to the maximum field-of-view of the optical lens assembly; and 2h is an image height corresponding to the maximum field-of-view of the optical lens assembly.

In one embodiment, the optical lens assembly may satisfy: $BFL/TTL \geq 0.1$, where TTL is a distance on the optical axis from a center of the object-side surface of the first lens to an imaging plane of the optical lens assembly; and BFL is a distance on the optical axis from a center of an image-side surface of the seventh lens to the imaging plane of the optical lens assembly.

In one embodiment, the optical lens assembly satisfies: $TTL/2h/FOV \leq 0.025$, where TTL is a distance on the optical axis from a center of the object-side surface of the first lens to an imaging plane of the optical lens assembly; FOV is the maximum field-of-view of the optical lens assembly; and 2h is an image height corresponding to the maximum field-of-view of the optical lens assembly.

In a sixth aspect, the present disclosure provides an optical lens assembly which may include a first lens, a second lens, a third lens, a fourth lens, a fifth lens, a sixth lens and a seventh lens, sequentially from an object side to an image side along an optical axis. Each of the first lens, the second lens, the third lens and the fifth lens may have a negative refractive power. Each of the fourth lens, the sixth lens and the seventh lens may have a positive refractive power. The fifth lens and the sixth lens may be cemented together. The optical lens assembly may satisfy: $(FOV \times F)/2h \geq 45$, where FOV is a maximum field-of-view of the optical lens assembly; F is a total focal length of the optical lens assembly; and 2h is an image height corresponding to the maximum field-of-view of the optical lens assembly.

In one embodiment, an object-side surface of the first lens may be a convex surface, and an image-side surface of the first lens may be a concave surface.

In one embodiment, an object-side surface of the second lens may be a convex surface, and an image-side surface of the second lens may be a concave surface.

In another embodiment, both of an object-side surface and an image-side surface of the second lens may be concave surfaces.

In one embodiment, an object-side surface of the third lens may be a concave surface, and an image-side surface of the third lens may be a convex surface.

In one embodiment, both of an object-side surface and an image-side surface of the fourth lens may be convex surfaces.

In one embodiment, an object-side surface of the fifth lens may be a convex surface, and an image-side surface of the fifth lens may be a concave surface.

In one embodiment, both of an object-side surface and an image-side surface of the sixth lens may be convex surfaces.

In one embodiment, both of an object-side surface and an image-side surface of the seventh lens may be convex surfaces.

In another embodiment, an object-side surface of the seventh lens may be a convex surface, and an image-side surface of the seventh lens may be concave surface.

In one embodiment, the optical lens assembly may have at least four aspherical lenses.

In one embodiment, all of the second lens, the third lens and the seventh lens may be aspherical lenses.

In one embodiment, the optical lens assembly may satisfy: $d2/TTL \leq 0.2$, where d2 is an air interval between the first lens and the second lens; and TTL is a distance on the optical axis from a center of an object-side surface of the first lens to an imaging plane of the optical lens assembly.

In one embodiment, a refractive index of a material of the first lens may be equal to or greater than 1.65.

In one embodiment, the optical lens assembly may satisfy: $D/2h/FOV \leq 0.02$, where FOV is a maximum field-of-view of the optical lens assembly; D is a maximum effective aperture of an object-side surface of the first lens corresponding to the maximum field-of-view of the optical lens assembly; and 2h is an image height corresponding to the maximum field-of-view of the optical lens assembly.

In one embodiment, the optical lens assembly may satisfy: $BFL/TTL \geq 0.1$, where TTL is a distance on the optical axis from a center of an object-side surface of the first lens to an imaging plane of the optical lens assembly; and BFL is a distance on the optical axis from a center of an image-side surface of the seventh lens to the imaging plane of the optical lens assembly.

In one embodiment, the optical lens assembly may satisfy: $TTL/2h/FOV \leq 0.025$, where TTL is a distance on the optical axis from a center of an object-side surface of the first lens to an imaging plane of the optical lens assembly; FOV is the maximum field-of-view of the optical lens assembly; and 2h is an image height corresponding to the maximum field-of-view of the optical lens assembly.

In a seventh aspect, the present disclosure provides an optical lens assembly which may include a first lens, a second lens, a third lens, a fourth lens, a fifth lens, a sixth lens and a seventh lens, sequentially from an object side to an image side along an optical axis. The first lens may have a negative refractive power, an object-side surface thereof is a convex surface, and an image-side surface thereof is a concave surface. The second lens may have a negative refractive power, an object-side surface thereof is a convex surface, and an image-side surface thereof is a concave surface. The third lens may have a negative refractive power, an object-side surface of the third lens is a concave surface, and an image-side surface of the third lens is a convex surface. The fourth lens may have a positive refractive power, and both of an object-side surface and an image-side surface of the fourth lens are convex surfaces. The fifth lens may have a positive refractive power, and both of an object-side surface and an image-side surface of the fifth lens are convex surfaces. The sixth lens may have a negative refractive power, and both of an object-side surface and an image-side surface of the sixth lens are concave surfaces. The seventh lens may have a positive refractive power, and both of an object-side surface and an image-side surface of the seventh lens are convex surfaces.

In one embodiment, the fifth lens and the sixth lens may be cemented together to form a first cemented lens.

In one embodiment, the optical lens assembly may have at least three aspherical lenses.

In one embodiment, all of the third lens, the fourth lens and the seventh lens are aspherical lenses.

In one embodiment, the optical lens assembly may satisfy: D/2h/FOV≤0.025, where FOV is a maximum field-of-view of the optical lens assembly; D is a maximum effective aperture of the object-side surface of the first lens corresponding to the maximum field-of-view of the optical lens assembly; and 2h is an image height corresponding to the maximum field-of-view of the optical lens assembly.

In one embodiment, the optical lens assembly may satisfy: (FOV×F)/2h≥50, where FOV is a maximum field-of-view of the optical lens assembly; F is a total focal length of the optical lens assembly; and 2h is an image height corresponding to the maximum field-of-view of the optical lens assembly.

In one embodiment, a focal length F2 of the second lens and a focal length F3 of the third lens may satisfy: F3/F2≤1.6.

In one embodiment, an optical back focus length BFL of the optical lens assembly and a total track length TTL of the optical lens assembly may satisfy: BFL/TTL≥0.05.

In one embodiment, the optical lens assembly may satisfy: TTL/2h/FOV≤0.025, where TTL is a total track length of the optical lens assembly; FOV is the maximum field-of-view of the optical lens assembly; and 2h is an image height corresponding to the maximum field-of-view of the optical lens assembly.

In one embodiment, a refractive index Nd1 of a material of the first lens may satisfy: Nd1≥1.65.

In one embodiment, an air interval d12 between the sixth lens and the seventh lens and a total track length TTL of the optical lens assembly may satisfy: d12/TTL≤0.035.

In one embodiment, a focal length F7 of the seventh lens and a total focal length F of the optical lens assembly may satisfy: F7/F≤3.

In one embodiment, a combined focal length F56 of the fifth lens and the sixth lens and a total focal length F of the optical lens assembly may satisfy: F56/F≤−10.

In an eighth aspect, the present disclosure provides an optical lens assembly which may include a first lens, a second lens, a third lens, a fourth lens, a fifth lens, a sixth lens and a seventh lens, sequentially from an object side to an image side along an optical axis. Each of the first lens, the second lens, the third lens and the sixth lens may have a negative refractive power. Each of the fourth lens, the fifth lens and the seventh lens may have a positive refractive power. The fifth lens and the sixth lens may be cemented together to form a cemented lens. The optical lens assembly may satisfy: (FOV×F)/2h≥50, where FOV is a maximum field-of-view of the optical lens assembly; F is a total focal length of the optical lens assembly; and 2h is an image height corresponding to the maximum field-of-view of the optical lens assembly.

In one embodiment, an object-side surface of the first lens may be a convex surface, and an image-side surface of the first lens may be a concave surface.

In one embodiment, an object-side surface of the second lens may be a convex surface, and an image-side surface of the second lens may be a concave surface.

In one embodiment, an object-side surface of the third lens may be a concave surface, and an image-side surface of the third lens may be a convex surface.

In one embodiment, both of an object-side surface and an image-side surface of the fourth lens may be convex surfaces.

In one embodiment, both of an object-side surface and an image-side surface of the fifth lens may be convex surfaces.

In one embodiment, both of an object-side surface and an image-side surface of the sixth lens may be concave surfaces.

In one embodiment, both of an object-side surface and an image-side surface of the seventh lens may be convex surfaces.

In one embodiment, the optical lens assembly may have at least three aspherical lenses.

In one embodiment, all of the third lens, the fourth lens and the seventh lens may be aspherical lenses.

In one embodiment, the optical lens assembly may satisfy: D/2h/FOV≤0.025, where FOV is a maximum field-of-view of the optical lens assembly; D is a maximum effective aperture of an object-side surface of the first lens corresponding to the maximum field-of-view of the optical lens assembly; and 2h is an image height corresponding to the maximum field-of-view of the optical lens assembly.

In one embodiment, a focal length F2 of the second lens and a focal length F3 of the third lens may satisfy: F3/F2≤1.6.

In one embodiment, an optical back focus length BFL of the optical lens assembly and a total track length TTL of the optical lens assembly may satisfy: BFL/TTL≥0.05.

In one embodiment, the optical lens assembly may satisfy: TTL/2h/FOV≤0.025, where TTL is a total track length of the optical lens assembly; FOV is the maximum field-of-view of the optical lens assembly; and 2h is an image height corresponding to the maximum field-of-view of the optical lens assembly.

In one embodiment, a refractive index Nd1 of a material of the first lens may satisfy: Nd1≥1.65.

In one embodiment, an air interval d12 between the sixth lens and the seventh lens and a total track length TTL of the optical lens assembly may satisfy: d12/TTL≤0.035.

In one embodiment, a focal length F7 of the seventh lens and a total focal length F of the optical lens assembly may satisfy: F7/F≤3.

In one embodiment, a combined focal length F56 of the fifth lens and the sixth lens and a total focal length F of the optical lens assembly may satisfy: F56/F≤−10.

In a ninth aspect, the present disclosure provides an imaging device which may include an optical lens assembly according to some of the above-mentioned embodiments and an imaging element for converting an optical image formed by the optical lens assembly into an electrical signal.

Some of the above-mentioned embodiments of the present disclosure may employ, for example, seven lenses, and the optical lens assembly has at least one advantageous effect such as high resolution, miniaturization, low cost, good temperature performance, small front end aperture, and the like by optimally configuration the shape of the lens, rationally distributing the refractive power of each lens and the like. In addition, some or other embodiments of the above-mentioned embodiments in the present application may also enable the optical lens assembly to achieve at least one of beneficial effects such as miniaturization, high resolution, low cost, and the like. Further, some or other embodiments of the above-mentioned embodiments in the present application may also enable the optical lens assembly to achieve at least one of beneficial effects such as small front end aperture, high pixels, miniaturization, ultra-large field of view, and the like. Further, some or other embodiments of the above-mentioned embodiments in the present application may also enable the optical lens assembly to achieve at least one of beneficial effects such as high resolution, miniaturization, large-angle resolution, stable temperature performance, small aperture, low cost, and the like.

BRIEF DESCRIPTION OF THE DRAWINGS

Other features, objects, and advantages of the present disclosure will become more apparent from the following detailed description of the non-limiting embodiments with reference to the accompanying drawings. In the accompanying drawings.

DETAILED DESCRIPTION OF EMBODIMENTS

Figure 1:
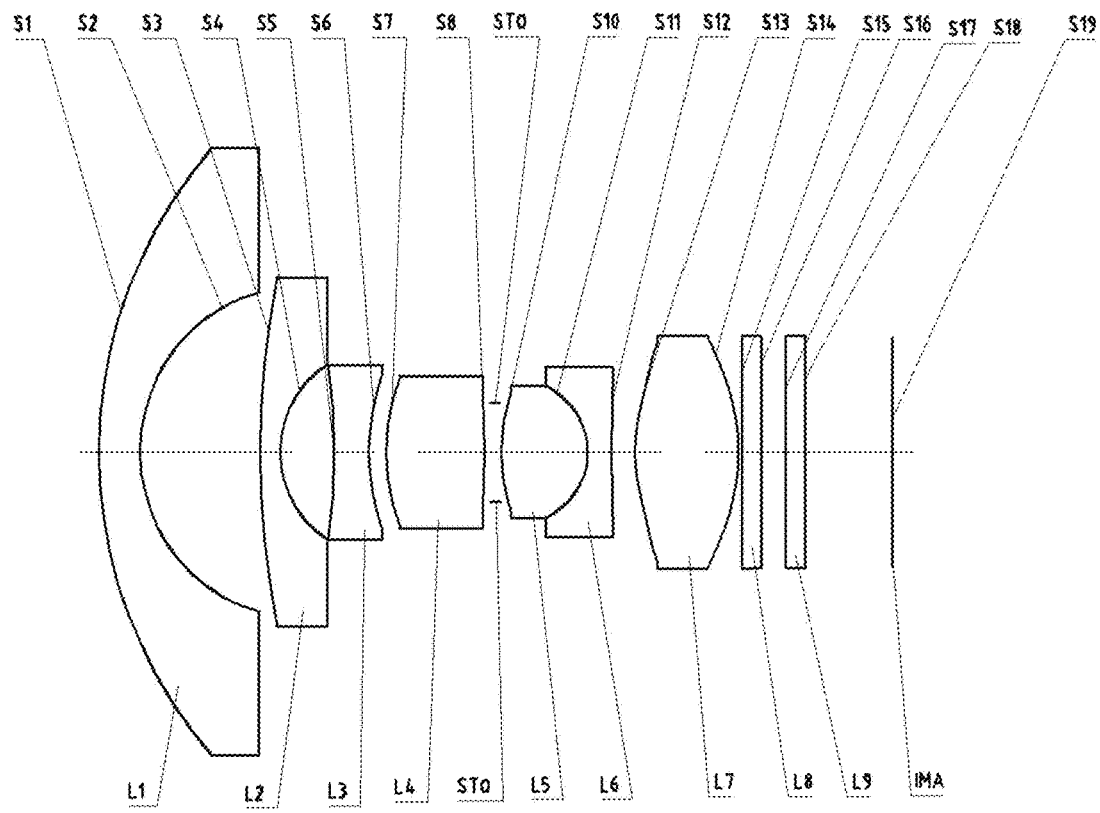
FIG. 1 illustrates a schematic structural view of an optical lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions "first, second, third and the like" are used only to distinguish one feature from another, without indicating any limitation to the feature. Thus, a first lens discussed below may also be referred to as a second lens or a third lens and a first cemented lens may also be referred to as a second cemented lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object side is referred to as an object-side surface, and the surface closest to the imaging plane is referred to as an image-side surface.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical lens assembly according to an exemplary embodiment of the present disclosure includes, for example, seven lenses having refractive power, i.e. a first lens, a second lens, a third lens, a fourth lens, a fifth lens, a sixth lens and a seventh lens. The seven lenses are arranged sequentially from an object side to an image side along an optical axis.

The optical lens assembly according to an exemplary embodiment of the present disclosure may further include a photosensitive element disposed on an imaging plane. Optionally, the photosensitive element disposed on the imaging plane may be a Charge-Coupled Device element (CCD) or a Complementary Metal-Oxide Semiconductor element (CMOS).

In an aspect, according to an embodiment of the present disclosure, a first lens may have a negative refractive power, an object-side surface thereof may be a convex surface and an image-side surface thereof may be a concave surface. The first lens is configured as a meniscus shape having a convex surface toward the object side to collect the light within a large field of view as much as possible, and to allow light to enter the rear optical system. In practical applications, considering the outdoor environment for installing the onboard lens assembly, which may be in bad weather such as rain or snow, such meniscus shape configuration having a convex surface toward the object side is more suitable. The meniscus shape configuration is advantageous to make water droplets drop to slide, prevent the accumulation of water and dust and thus reduce the influence of the external environment on imaging.

The second lens may have a negative refractive power, and an object-side surface thereof may be a convex surface and an image-side surface thereof may be a concave surface. The second lens compresses the light collected by the first lens, which in turn smoothly transmits the light to the rear optical system. Advantageously, to shape the image-side surface of the second lens to be concave may reduce the distance between the first lens and the second lens, which makes it easier to shorten the physical length of the lens assembly and achieve miniaturization characterization.

The third lens may have a negative refractive power, and both of an object-side surface and an image-side surface thereof may be concave surfaces. The third lens may diverge light to transmit the light to the rear optical system, and compromise the aberrations caused by the front and rear lenses. In addition, to shape the third lens as biconcave may reduce the overall length of the lens assembly. Moreover, the third lens employs a lens having a negative focal length, which may compensate an offset of a back focus length of the entirety lens assembly at a high or a low temperature, and ensure the lens assembly have a good resolution at a high or a low temperature.

The fourth lens may have a positive refractive power, and an object-side surface thereof may be a convex surface. The fourth lens may converge light and allow light to smoothly transmit to the rear optical system.

The fifth lens may have a positive refractive power, and both of an object-side surface and an image-side surface thereof may be convex surfaces.

The sixth lens may have a negative refractive power, and both of an object-side surface and an image-side surface thereof may be concave surfaces.

The seventh lens may have a positive refractive power, and both of an object-side surface and an image-side surface thereof may be convex surfaces. The seventh lens is a converging lens and may appropriately converge light.

As known to those skilled in the art, cemented lenses may be used to minimize reduce or eliminate chromatic aberration. Using a cemented lens in an optical lens assembly may improve image quality and reduce reflection losses of light energy, thereby improving the imaging sharpness of the lens assembly. In addition, the use of a cemented lens may also simplify the assembly process in the lens assembly manufacturing process.

In an exemplary embodiment, the fifth lens and the sixth lens can be combined into a cemented lens by cementing an image-side surface of the fifth lens with an object-side surface of the sixth lens. This cemented lens may be useful to eliminate the effects of chromatic aberration, reduce field curvature, and correct coma. Meanwhile, the cemented lens may also remain a part of chromatic aberration to balance the overall chromatic aberration of the optical system. By cementing of the lenses, the air gap between these two lenses are omitted, thereby making the overall structure of the optical system compact and meeting the requirements of miniaturization. In addition, by cementing these lenses, it will reduce the tolerance sensitivity issues (such as tilt or eccentricity) of the lens unit, which otherwise will be introduced in the assembly process.

In the cemented lens, the fifth lens near the object side has a positive refractive power, and the sixth lens near the image side has a negative refractive power. Such configuration is advantageous for further converging the light passing through the fourth lens and then transitioning the light to the rear optical system, which is advantageous for reducing the effective aperture radius/size of the rear end of the lens assembly and reducing the total length of the system, and thereby achieving a short TTL. In addition, the light will diverge slightly after passing through the sixth lens, which helps the lens assembly to match a larger size chip.

In an exemplary embodiment, a stop for limiting the light beam may be disposed between, for example, the fourth lens and the fifth lens to further improve the imaging quality of the lens assembly. When the stop is disposed between the fourth lens and the fifth lens, it may effectively converge the front and rear light, shorten the total length of the optical system, and reduce the aperture of the front and rear lens groups.

In an exemplary embodiment, a maximum field-of-view FOV of the optical lens assembly, a maximum effective aperture D of an object-side surface of a first lens corresponding to a maximum field-of-view of the optical lens assembly, and an image height 2h corresponding to the maximum field-of-view of the optical lens assembly may satisfy: $D/2h/FOV \leq 0.025$. More desirable, D, h and FOV may further satisfy $D/2h/FOV \leq 0.02$. Satisfying the conditional expression $D/2h/FOV \leq 0.025$ may ensure a small front end aperture of the lens assembly.

In an exemplary embodiment, an optical back focus length BFL of the optical lens assembly and the total track length TTL of the optical lens assembly may satisfy $BFL/TTL \geq 0.1$. More specifically, BFL and TTL may further satisfy $BFL/TTL \geq 0.13$. Setting the back focus length to satisfy $BFL/TTL \geq 0.1$ and combining the overall structure of the optical lens assembly may facilitate the assembly of the optical lens assembly.

In an exemplary embodiment, a total track length TTL of the optical lens assembly, a maximum field-of-view FOV of the optical lens assembly and an image height 2h corresponding to the maximum field-of-view of the optical lens assembly may satisfy $TTL/2h/FOV \leq 0.025$. More desirable, TTL, FOV and 2h may further satisfy $TTL/2h/FOV \leq 0.02$. With the same field of view and the same imaging plane, the lens assembly satisfying the conditional expression $TTL/2h/FOV \leq 0.025$ has a shorter TTL than that of the other lenses assembly. The lens assembly may be miniaturized.

In an exemplary embodiment, a radius of curvature r31 of an object-side surface of the third lens, a radius of curvature r32 of an image-side surface of the third lens and a center thickness d3 of the third lens may satisfy $(|r31|+d3)/|r32| \leq 12$. More desirable, $(|r31|+d3)/|r32| \leq 8$ may be further satisfied. The shape configuration of the third lens is advantageous for improving the imaging quality and shortening the total optical length of the system.

In an exemplary embodiment, a first lens may be formed by a material having a high refractive index. Specifically, for example, a refractive index of the material of the first lens may be greater than or equal to 1.65. More desirable, the refractive index of the material of the first lens may be greater than or equal to 1.7. Such configuration is advantageous for reducing the front end aperture of the lens assembly and improving the imaging quality.

In an exemplary embodiment, the optical lens assembly according to the present disclosure has at least three aspherical lenses. The aspherical lens is characterized by a continuous change in curvature from the center of the lens to the periphery of the lens. Unlike a spherical lens having a constant curvature from the center of the lens to the periphery of the lens, the aspherical lens has a better curvature radius characteristic, and has the advantages of improving distortion aberration and improving astigmatic aberration. By using an aspherical lens, the aberrations that occur during imaging may be eliminated as much as possible, and thus improving the image quality. For example, the first lens may be an aspherical lens, which may help improve a resolution quality. The seventh lens may be an aspherical lens to reduce an optical path of a peripheral light to an imaging plane, correct an off-axis point aberration of the system, and optimize a performance of distortion and CRA. In addition, the seventh lens using an aspherical lens may make the light converge effectively and smoothly at the rear end of the system, and may reduce the overall weight and cost of the system.

In an exemplary embodiment, each of the lenses used in the optical lens assembly may be a plastic lens or a glass lens. Since plastic lenses have a large thermal expansion coefficient, plastic lenses will have a greater impact on the overall performance of the lens assembly when the ambient temperature in which the lens assembly is located changes greatly. Using glass lenses may reduce the impact on the performance of the lens assembly caused by temperature. At least one lens of the optical lens assembly according to the present disclosure is a glass lens, so as to reduce the influence of the environment on the entire system and improve the overall performance of the optical lens assembly. For example, the first lens may be a glass lens. More desirable, the first lens may be an aspherical lens formed by glass to further improve the imaging quality and reduce the front end aperture.

By optimally setting the lens shape and reasonably distributing the refractive power, the optical lens assembly according to the above embodiments of the present disclosure may have a small front end aperture and a shorter TTL and may have a high resolution while ensuring the miniaturization of the lens assembly. In the case that the same resolution capability is required, as compared with an optical lens assembly that must use glass aspheric surfaces, the optical lens assembly according to the disclosure may achieve the same requirements without using glass aspheric surfaces, and thus reduces costs. The disclosure employing seven lenses may maintain a stable high-resolution capability at a high or a low temperature, and may well adapt to the using requirements of the vehicle environment.

In another aspect, according to the embodiment of the present disclosure, a first lens may have a negative refractive power, an object-side surface of the first lens is a convex surface, and an image-side surface of the first lens is a concave surface.

By configuring the first lens as a meniscus shape having a convex surface toward the object side, the first lens may collect a light within a large field of view as much as possible, and allow the light to enter the rear optical system.

The first lens is configured as a meniscus shape having a convex surface toward the object side to collect a light within a large field of view as much as possible, and to allow the light to enter the rear optical system. In actual use, since the wide-angle lens assembly may be installed outside the vehicle, the lens assembly may encounter harsh weather. The convex shape employed by the first lens according to the present disclosure prevent the accumulation of water and dust, and thus may reduce the influence of the external environment on imaging.

In an alternative embodiment, a refractive index Nd1 of a material forming the first lens of the optical lens assembly satisfies the conditional expression: $Nd1 \geq 1.7$. For example, the conditional expression $Nd1 \geq 1.76$ may be further satisfied. Satisfying the conditional expression $Nd1 \geq 1.7$ is beneficial for reducing the front end aperture of the optical system and improving the imaging quality of the optical system.

Optionally, in order to further reduce the front end aperture and improve the imaging quality, the first lens is made of a material having a high refractive index. Further optionally, the first lens may be a glass aspherical lens.

A second lens may have a negative refractive power, an object-side surface of the second lens is a convex surface, and an image-side surface of the second lens is a concave surface. The second lens compresses the light collected by the first lens to allow the light to transmit smoothly. Designing the image-side surface of the second lens as a concave surface is advantageous for reducing the distance between the first lens and the second lens, which makes it easier to shorten the physical length of the lens assembly and achieve miniaturization.

A third lens may have a negative refractive power, an object-side surface of the third lens is a concave surface, and an image-side surface of the third lens is a convex surface. In such a case, the third lens may diverge light and allow the diverged light to enter the rear system smoothly, and at the same time may balance the spherical aberration and positional chromatic aberration introduced by the front two groups lenses (specifically, the first lens and the second lens).

A fourth lens may have a positive refractive power, an object-side surface of the fourth lens is a convex surface, and an image-side surface of the fourth lens is a concave surface. In such a case, the fourth lens may compress the light to make the light transition smoothly. At the same time, the meniscus shape of the fourth lens may greatly shorten the total length of the lens assembly and improve chromatic aberration of the lens assembly.

In an alternative embodiment, a radius of curvature r41 of an object-side surface of the fourth lens of the optical lens assembly, a center thickness d4 of the fourth lens of the optical lens assembly and a radius of curvature r42 of an image-side surface of a fourth lens of the optical lens assembly satisfy the conditional expression: $0.4 \leq (|r41|+d4)/|r42| \leq 0.8$. For example, the conditional expression $0.5 \leq (|r41|+d4)/|r42| \leq 0.7$ may be further satisfied. Configuring the specific shape of the fourth lens to satisfy the conditional expression of $0.4 \leq (|r41|+d4)/|r42| \leq 0.8$ may be helpful to improve the imaging quality and shorten the total length of the optical lens assembly.

A fifth lens and a sixth lens may be glued together. Gluing the fifth lens and the sixth lens may eliminate the chromatic aberration introduced by themselves and reduce the sensitivity of the tolerance. At the same time, a part of the chromatic aberration may be remained to balance the chromatic aberration of the system.

In an alternative embodiment, a fifth lens may have a positive refractive power, and both of an object-side surface and an image-side surface of the fifth lens are convex surfaces. A sixth lens may have a negative refractive power, and both of an object-side surface and an image-side surface of the sixth lens are concave surfaces.

By gluding the fifth lens and the sixth lens with the arrangement of the positive lens in the front and the negative lens behind, the front light may be further converged and then transitioned to the rear system, the rear end aperture/size of the lens assembly and the total length of the optical system may be reduced.

A seventh lens may have a positive refractive power, and both of an object-side surface and an image-side surface of the seventh lens are convex surfaces. Configurating the seventh lens as a biconvex lens with a positive refractive power may further converge light.

Optionally, the seventh lens may be an aspherical lens. In such a case, an optical path of a peripheral light reaching an imaging surface may be reduced, an off-axis point aberration of the system may be corrected, and an optical performance such as distortion and CRA may be optimized. In addition, by adapting an aspheric surface, the seventh lens may effectively and smoothly converge the light at the end, thereby reducing the overall weight and cost.

In an alternative embodiment, at least four lenses among the first lens, the second lens, the third lens, the fourth lens, the fifth lens, the sixth lens and the seventh lens are aspherical lenses. Further optionally, the second lens, the third lens, and the seventh lens are aspherical lenses.

In an alternative embodiment, a stop is disposed between the fourth lens and a cemented lens formed by the fifth lens and the sixth lens. The stop may collect the front and rear light, shorten the total length of the optical system, and reduce the aperture of the front and rear lens groups. However, it should be moted that the disposed position of the stop herein is only exemplary and not limiting. For example, the stop may be disposed at other locations as needed.

As needed, the optical lens assembly may further include a optical filter disposed between the seventh lens and an imaging plane to optical filter light having different wavelengths. In addition, optionally, the optical lens assembly according to the present disclosure may further include a protective glass disposed between the optical filter and the imaging plane.

In an alternative embodiment, a maximum effective aperture D of the object-side surface of the first lens corresponding to a maximum field-of-view of the optical lens assembly, an image height 2h corresponding to the maximum field-of-view of the optical lens assembly and the maximum field-of-view FOV of the optical lens assembly satisfy the conditional expression: D/2h/FOV≤0.02. For example, the conditional expression D/2h/FOV≤0.016 may be further satisfied. Satisfying the conditional expression D/2h/FOV≤0.02 may achieve a small front aperture of the optical lens assembly.

In an alternative embodiment, a total track length (i.e. a distance from a center of an object-side surface of the first lens of the optical lens assembly to an imaging plane of the optical lens assembly) TTL of the optical lens assembly, an image height 2h corresponding to a maximum field-of-view of the optical lens assembly and the maximum field-of-view FOV of the optical lens assembly satisfy the conditional expression: TTL/2h/FOV≤0.025. For example, the conditional expression TTL/2h/FOV≤0.020 may be further satisfied. Satisfying the conditional expression TTL/2h/FOV≤0.025 may achieve miniaturization of the optical lens assembly. More specifically, compared with other lens assemblies, the optical lens assembly of the present disclosure has a shorter optical length TTL with the same field of view and the same imaging plane.

In an alternative embodiment, an optical back focus length (i.e. a distance from a center of an image-side surface of the seventh lens of the optical lens assembly to an imaging plane of the optical lens assembly) BFL of the optical lens assembly and a total track length (i.e. a distance from a center of an object-side surface of the first lens of the optical lens assembly to an imaging plane of the optical lens assembly) TTL of the optical lens assembly satisfy the conditional expression: BFL/TTL≥0.1. For example, the conditional expression BFL/TTL≥0.14 may be further satisfied. Satisfying the conditional BFL/TTL≥0.1 and combined with the overall structure, such a back focus length configuration may be advantageous for assembly.

By rationally designing and arranging a plurality of lenses (for example, the above seven lenses) and reasonably distributing the refractive power, the front end aperture of the optical lens assembly according to the above embodiment of the present disclosure may be reduced, and the total optical length of the optical lens assembly may be shortened, thereby ensuring the miniaturization of the lens assembly and improving the resolution. At the same time, compared with an optical lens assembly using glass aspherical surface to achieve high resolution, the optical lens according to the above-mentioned embodiments of the present disclosure has a lower cost when the same resolution is achieved, and may achieve a resolution of 4M or more.

In yet an aspect, the first lens may have a negative refractive power, an object-side surface thereof may be a convex surface and an image-side surface thereof may be a concave surface. The first lens is configured as a meniscus shape having a convex surface toward the object side to collect the light within a large field of view as much as possible, and to allow the light to enter the rear optical system. In practical applications, considering the outdoor environment for installing of the on-board lens assembly, which may be in bad weather such as rain or snow, such meniscus shape configuration having a convex surface toward the object side is advantageous to make water droplets drop to slide and thus reduce the influence of the external environment on imaging. Optionally, the first lens may be made of a material having a high refractive index. For example, a refractive index Nd1 of the first lens satisfy Nd1≥1.65. Desirably, Nd1≥1.7. Such a configuration is beneficial to reduce the front end aperture and improve imaging quality.

The second lens may have a negative refractive power, an object-side surface thereof is optionally a convex surface or a concave surface, and an image-side surface thereof may be a concave surface. The second lens appropriately compresses the light collected by the first lens to smoothly transition the light to the rear optical system. Configuring the image-side surface of the second lens to be a concave surface is advantageous for reduce the distance between the first lens and the second lens, which makes it easier to shorten the physical length of the lens assembly and achieve miniaturization.

The third lens may have a negative refractive power, an object-side surface thereof may be a concave surface, and an image-side surface thereof may be a convex surface. The third lens having the negative refractive power may balance spherical aberration and positional chromatic aberration introduced by the front two group lenses. In addition, such meniscus shape configuration having a convex surface toward the object side is beneficial to reduce the total length of the optical system.

The fourth lens may have a positive refractive power, and both of an object-side surface and an image-side surface thereof may be convex surfaces. The fourth lens may converge light and allow the divergent light to enter the rear optical system smoothly. That is, the fourth lens compresses the light so that the light smoothly transitions to the rear optical system.

The fifth lens may have a negative refractive power, an object-side surface thereof may be a convex surface, and an image-side surface thereof may be a concave surface.

The sixth lens may have a positive refractive power, and both of an object-side surface and an image-side surface may be convex surfaces.

The seventh lens may have a positive refractive power, an object-side surface thereof may be a convex surface, and an image-side surface thereof is optionally a convex surface or a concave surface. The seventh lens is a converging lens so that the light may be effectively and smoothly converged at the end. Such configuration may allow the light to reach the imaging plane smoothly, and may reduce the overall weight and cost of the optical system.

In an exemplary embodiment, a stop for limiting the light beam may be disposed between, for example, the fourth lens and the fifth lens to further improve the imaging quality of the lens assembly. When the stop is disposed between the fourth lens and the fifth lens, it may effectively converge the front and rear light, shorten the total length of the optical system effectively, and reduce the aperture of the front and rear lens groups. It should be noted, however, that the locations of the stop disclosed herein is merely an example and not limiting. In alternative embodiments, the stop may be disposed at other positions according to actual requirements.

In an exemplary embodiment, as required, the optical lens assembly according to the present disclosure may further include a optical filter disposed between the seventh lens and an imaging plane to optical filter light having different wavelengths; and may further include a protective glass disposed between the optical filter and the imaging plane to prevent internal components (for example, a chip) of the optical lens assembly from being damaged.

As known to those skilled in the art, cemented lenses may be used to minimize reduce or eliminate chromatic aberration. Using a cemented lens in an optical lens assembly may improve image quality and reduce reflection losses of light energy, thereby improving the imaging sharpness of the lens assembly. In addition, the use of a cemented lens may also simplify the assembly process in the lens assembly manufacturing process.

In an exemplary embodiment, the fifth lens and the sixth lens can be combined into a cemented lens by cementing an image-side surface of the fifth lens with an object-side surface of the sixth lens. Using the cemented lens formed by the fifth lens and the sixth lens may be useful to eliminate the effects of chromatic aberration, reduce field curvature, and correct coma. Meanwhile, the cemented lens may also remain a part of chromatic aberration to balance the overall chromatic aberration of the optical system. By cementing these lenses, the air gap between these two lenses are omitted, thereby making the overall structure of the optical system compact and meeting the requirements of miniaturization. In addition, by cementing these lenses, it will reduce the tolerance sensitivity issues (such as tilt or eccentricity) of the lens unit, which otherwise will be introduced in the assembly process.

In the cemented lens, the fifth lens near the object side has a positive refractive power, and the sixth lens near the image side has a negative refractive power. Such configuration is advantageous for diverging and quickly converging the front light before transitioning it to the rear system. Such configuration is also advantageous for reducing the optical path of the rear light, achieving a short TTL, and reducing the tolerance sensitivity of the system.

In an exemplary embodiment, an air interval d2 between the first lens and the second lens and a total track length TTL of the optical lens assembly may satisfy: $d2/TTL \leq 0.2$. More desirable, $d2/TTL \geq 0.18$ may be further satisfied.

In an exemplary embodiment, a maximum field-of-view FOV of the optical lens assembly, a total focal length F of the optical lens assembly and an image height 2h corresponding to the maximum field-of-view of the optical lens assembly may satisfy: $(FOV \times F)/2h \geq 45$. More desirable, $(FOV \times F)/2h \geq 50$ may be further satisfied. Satisfying the conditional expression $(FOV \times F)/2h \geq 45$ may realize large angle resolution.

In an exemplary embodiment, a maximum field-of-view FOV of the optical lens assembly, a maximum effective aperture D of an object-side surface of the first lens corresponding to the maximum field-of-view of the optical lens assembly and an image height 2h corresponding to the maximum field-of-view of the optical lens assembly may satisfy: $D/2h/FOV \leq 0.02$. More desirable, $D/2h/FOV \leq 0.018$ may be further satisfied. Satisfying the conditional expression $D/2h/FOV \leq 0.02$ may achieve a small front end aperture of the lens assembly.

In an exemplary embodiment, an optical back focus length BFL of the optical lens assembly and the total track length TTL of the optical lens assembly may satisfy: $BFL/TTL \geq 0.1$. More desirable, $BFL/TTL \geq 0.11$ may be further satisfied. Setting the back focus length to satisfy $BFL/TTL \geq 0.1$ and combining the overall structure of the optical lens assembly may facilitate the assembly of the optical lens assembly.

In an exemplary embodiment, a total track length TTL of the optical lens assembly, a maximum field-of-view FOV of the optical lens assembly and an image height 2h corresponding to the maximum field-of-view of the optical lens assembly may satisfy: $TTL/2h/FOV \leq 0.025$. More desirable, $TTL/2h/FOV \leq 0.02$ may be further satisfied. Satisfying the conditional expression $TTL/2h/FOV \leq 0.025$ may achieve miniaturization. Also, compared with other lens assemblies, the lens assembly satisfying the above condition has a shorter TTL with the same field of view and the same image height.

In an exemplary embodiment, the optical lens assembly according to the present disclosure has at least four aspherical lenses. The aspherical lens is characterized by a continuous change in curvature from the center of the lens to the periphery of the lens. Unlike a spherical lens having a constant curvature from the center of the lens to the periphery of the lens, the aspherical lens has a better curvature radius characteristic, and has the advantages of improving distortion aberration and improving astigmatic aberration. By using an aspherical lens, the aberrations that occur during imaging may be eliminated as much as possible, and thus improving the image quality. For example, the seventh lens may be an aspherical lens to reduce an optical path of a peripheral light to an imaging plane, correct an off-axis point aberration of the system, and optimize a performance of distortion and CRA. Desirably, all of the second lens, the third lens, and the seventh lens are aspherical lenses to effectively improve the imaging quality of the lens assembly. In addition, one or more of the first lens, the fifth lens, and the sixth lens may also employ an aspherical lens to improve imaging quality. It should be understood that, in order to improve the imaging quality, the number of aspherical lenses in the optical lens assembly according to the present disclosure may be increased.

In an exemplary embodiment, each of the lenses used in the optical lens assembly may be a plastic lens or a glass lens. Since plastic lenses have a large thermal expansion coefficient, plastic lenses will have a greater impact on the overall performance of the lens assembly when the ambient temperature in which the lens assembly is located changes greatly. Using glass lenses may reduce the impact on the performance of the lens assembly caused by temperature. The first lens in the optical lens assembly according to the present disclosure is a glass lens to reduce the influence of the environment on the entire system and improve the overall performance of the optical lens assembly. Desirably, the first lens may be an aspherical lens formed by glass to further improve the imaging quality and reduce the front end aperture.

By optimally setting the lens shape, reasonably distributing the refractive power and reasonably selecting the material of the lens, the optical lens assembly according to the above embodiments of the present disclosure may have a small front end aperture and a shorter TTL and may achieve characters of high resolution, ultra-large field of view and the like while ensuring the miniaturization of the lens assembly. In addition, the lens assembly employing seven lenses according to the present disclosure may get more than four million pixels, and may achieve higher sharpness. Compared with a conventional wide-angle lens, the lens assembly according to the present disclosure has a longer focal length and a large angle resolution in the center area, which may improve the recognition for environmental objects and increase in a targeted manner, the detection area of the center portion. The optical lens assembly of the present disclosure reduces tolerance sensitivity effectively by properly setting the positions of the positive and negative lenses in the cemented lens. The optical lens assembly according to the above embodiments of the present disclosure may better match the requirements of an on-board lens assembly.

In further yet an aspect, the first lens may have a negative refractive power, an object-side surface thereof may be a convex surface and an image-side surface thereof may be a concave surface. The first lens is configured as a meniscus shape having a convex surface toward the object side to collect the light within a large field of view as much as possible, and to allow the light to enter the rear optical system. In practical applications, considering the outdoor environment for installing the on-board lens assembly, which may be in bad weather such as rain or snow, such meniscus shape configuration having a convex surface toward the object side is beneficial to make water droplets drop to slide and thus reduce the influence of the external environment on imaging. Further, the first lens may be a glass aspherical lens to further improve the imaging quality and reduce the front end aperture. Meanwhile, the first lens may be made of a material having a high refractive index. For example, a refractive index Nd1 of the first lens satisfy Nd1≥1.65. More desirable, Nd1≥1.7 may be further satisfied to help reduce the front end aperture and improve imaging quality.

The second lens may have a negative refractive power, an object-side surface thereof may be a convex surface and an image-side surface thereof may be a concave surface. The second lens may properly compress the light collected by the first lens to smoothly transition the light. Configuring the image-side surface of the second lens to be a concave surface is advantageous for reducing the distance between the first lens and the second lens, which makes it easier to shorten the physical length of the lens assembly and achieve miniaturization character.

The third lens may have a negative refractive power, an object-side surface thereof may be a concave surface, and an image-side surface thereof may be a convex surface. The third lens having the negative refractive power may balance spherical aberration and positional chromatic aberration introduced by the front two group lenses. In addition, such meniscus shape configuration having a convex surface toward the object side is beneficial to reduce the total length of the optical system.

The fourth lens may have a positive refractive power, and both of an object-side surface and an image-side surface thereof may be convex surfaces. The fourth lens may converge light and allow the divergent light to enter the rear optical system smoothly. That is, the fourth lens may compress the light and allow the light to transmit smoothly.

The fifth lens may have a positive refractive power, and both of an object-side surface and an image-side surface thereof may be convex surfaces.

The sixth lens may have a negative refractive power, and both of an object-side surface and an image-side surface thereof may be concave surfaces.

The seventh lens may have a positive refractive power, and an object-side surface and an image-side surface thereof may be convex surfaces. The seventh lens is a converging lens so that the light may be effectively and smoothly converged at the end. Such configuration may allow the light to reach the imaging plane smoothly, and may reduce the overall weight and cost of the optical system. In addition, the seventh lens (the last lens) with a short focal length may help to collect light and ensure the light throughput of the system.

In an exemplary embodiment, a stop for limiting the light beam may be disposed between, for example, the fourth lens and the fifth lens to further improve the imaging quality of the lens assembly. Setting the stop may effectively converge the front and rear light, shorten the total length of the optical system effectively, and reduce the aperture of the front and rear lens groups. It should be noted, however, that the locations of the stop disclosed herein is merely an example and not limiting. In alternative embodiments, the stop may be disposed at other positions according to actual requirements.

In an exemplary embodiment, as required, the optical lens assembly according to the present disclosure may further include a optical filter disposed between the seventh lens and an imaging plane to optical filter light having different wavelengths; and may further include a protective glass disposed between the optical filter and the imaging plane to prevent internal components (for example, a chip) of the optical lens assembly from being damaged.

As known to those skilled in the art, cemented lenses may be used to minimize reduce or eliminate chromatic aberration. Using a cemented lens in an optical lens assembly may improve image quality and reduce reflection losses of light energy, thereby improving the imaging sharpness of the lens assembly. In addition, the use of a cemented lens may also simplify the assembly process in the lens assembly manufacturing process.

In an exemplary embodiment, the fifth lens and the sixth lens can be combined into a cemented lens by cementing an image-side surface of the fifth lens with an object-side surface of the sixth lens. In this cemented lens, the positive lens (the fifth lens) is arranged forward and the negative lens (the six lens) is arranged rear. This arrangement may further converge the front light and then transition it to the rear. Double lens composed of positive and negative lenses may eliminate the chromatic aberration introduced by themselves and reduce the sensitivity of the tolerance. Also, a part of the chromatic aberration may be remained to balance the chromatic aberration of the system.

In an exemplary embodiment, a maximum field-of-view FOV of the optical lens assembly, a maximum effective aperture D of an object-side surface of the first lens corresponding to the maximum field-of-view of the optical lens assembly and an image height 2h corresponding to the maximum field-of-view of the optical lens assembly may satisfy: D/2h/FOV≤0.025. More desirable, D/2h/FOV≤0.02 may be further satisfied. Satisfying the conditional expression D/2h/FOV≤0.025 may ensure a small front end aperture of the lens assembly.

In an exemplary embodiment, a maximum field-of-view FOV of the optical lens assembly, a total focal length F of the optical lens assembly and an image height 2h corresponding to the maximum field-of-view of the optical lens assembly may satisfy: (FOV×F)/2h≥50. More desirable, (FOV×F)/2h≥55 may be further satisfied. Satisfying the conditional expression (FOV×F)/2h≥50 may realize large angle resolution.

In an exemplary embodiment, a focal length F2 of the second lens and a focal length of the third lens may satisfy: F3/F2≤1.6. More desirable, F3/F2≤1.4 may be further satisfied. The proper configuration of the refractive power of two adjacent lenses may advantageous for the smooth transition of light.

In an exemplary embodiment, an optical back focus length BFL of the optical lens assembly and the total track length TTL of the optical lens assembly may satisfy: BFL/TTL≥0.05. More desirable, BFL/TTL≥0.08 may be further satisfied. When the conditional expression BFL/TTL≥0.05 is satisfied, the lens assembly may have a long back focus length on the basis of miniaturization, which is beneficial to the assembly of the optical module.

In an exemplary embodiment, a total track length TTL of the optical lens assembly, a maximum field-of-view FOV of the optical lens assembly and an image height 2h corresponding to the maximum field-of-view of the optical lens assembly may satisfy: TTL/2h/FOV≤0.025. More desirable, TTL/2h/FOV≤0.02 may be further satisfied. Satisfying the conditional expression TTL/2h/FOV≤0.025 may achieve miniaturization. Also, compared with other lens assemblies, the lens assembly satisfying the above condition has a shorter TTL with the same field of view and the same image height.

In an exemplary embodiment, an air interval d12 between the sixth lens and the seventh lens and a total track length TTL of the optical lens assembly may satisfy: d12/TTL≤0.035. More desirable, d12/TTL≤0.03 may be further satisfied. Satisfying the conditional expression d12/TTL≤0.035 helps to make the light diverged by the fifth lens and the sixth lens (a cemented lens) smoothly transition to the rear lens.

In an exemplary embodiment, a focal length F7 of the seventh lens and a total focal length F of the optical lens assembly may satisfy: F7/F≤3. More desirable, F7/F≤2.8 may be further satisfied. Configuring the seventh lens to have a short focal length may help to collect light to ensure the amount of light passing through the system.

In an exemplary embodiment, a combined focal length F56 of the fifth lens and the sixth lens and a total focal length F of the optical lens assembly may satisfy: F56/F≤−10. More desirable, F56/F≤−12 may be further satisfied. Controlling the light trend between the fourth lens and the seventh lens may reduce aberrations caused by the large-angle light entering through the fourth lens.

In an exemplary embodiment, the optical lens assembly according to the present disclosure has at least three aspherical lenses. The aspherical lens is characterized by a continuous change in curvature from the center of the lens to the periphery of the lens. Unlike a spherical lens having a constant curvature from the center of the lens to the periphery of the lens, the aspherical lens has a better curvature radius characteristic, and has the advantages of improving distortion aberration and improving astigmatic aberration. By using an aspherical lens, the aberrations that occur during imaging may be eliminated as much as possible, and thus improving the image quality. As described above, the first lens may be an aspherical lens to improve the imaging quality. For example, the seventh lens may be an aspherical lens to reduce an optical path of a peripheral light to an imaging plane, correct an off-axis point aberration of the system, and optimize a performance of distortion and CRA. It should be understood that, in order to improve the imaging quality, the number of aspherical lenses in the optical lens assembly according to the present disclosure may be increased.

In an exemplary embodiment, each of the lenses used in the optical lens assembly may be a plastic lens or a glass lens. Since plastic lenses have a large thermal expansion coefficient, plastic lenses will have a greater impact on the overall performance of the lens assembly when the ambient temperature in which the lens assembly is located changes greatly. Using glass lenses may reduce the impact on the performance of the lens assembly caused by temperature, but the cost is higher. As described above, the first lens may be a glass lens. Desirably, the first lens to the seventh lens may be made of glass, so that the optical lens assembly has a more stable temperature performance under high or low temperature of the external environment.

By optimally setting shape of the lens and reasonably distributing the refractive power, the optical lens assembly according to the above embodiments of the present disclosure may have a small front end aperture and a shorter TTL and may have a high resolution while ensuring the miniaturization of the lens assembly. The optical lens assembly may get more than four million pixels, and may achieve higher sharpness. Compared with a conventional wide-angle lens, the lens optical assembly has a longer focal length and a large angle resolution in the center area, which may improve the recognition for environmental objects and increase, in a targeted manner, the detection area of the center portion. The optical lens assembly according to the present disclosure may employ an all-glass structure, which has a more stable thermal performance at a high or a low temperature of the external environment, thereby greatly improving the safety of autonomous driving. Therefore, the optical lens assembly according to the above embodiments of the present disclosure may better match the requirements of an on-board lens assembly.

However, it will be understood by those skilled in the art that the number of lenses constituting the lens assembly may be varied to achieve the various results and advantages described in this specification without departing from the technical solution claimed by the present disclosure. For example, although the embodiment is described by using seven lenses as an example, the optical lens assembly is not limited to include seven lenses. The optical lens assembly may also include other numbers of lenses if desired.

Some specific examples of an optical lens assembly applicable to the above embodiment will be further described below with reference to the accompanying drawings.

Example 1

An optical lens assembly according to Example 1 of the present disclosure is described below with reference to FIG. 1. FIG. 1 is a schematic structural view showing an optical lens assembly according to Example 1 of the present disclosure.

As shown in FIG. 1, the optical lens assembly includes a first lens L1, a second lens L2, a third lens L3, a fourth lens L4, a fifth lens L5, a sixth lens L6 and a seventh lens L7, sequentially from an object side to an image side along an optical axis.

The first lens L1 is a meniscus lens having a negative refractive power, an object-side surface S1 thereof is a convex surface, and an image-side surface S2 thereof is a concave surface. The second lens L2 is a meniscus lens having a negative refractive power, an object-side surface S3 thereof is a convex surface, and an image-side surface S4 thereof is a concave surface. The third lens L3 is a biconcave lens having a negative refractive power, and both of an object-side surface S5 and an image-side surface S6 thereof are concave surfaces. In addition, the third lens L3 is an aspherical lens, and the object-side surface S5 and the image-side surface S6 thereof are aspherical surfaces. The fourth lens L4 is a biconvex lens having a positive refractive power, and both of an object-side surface S7 and an image-side surface S8 thereof are convex surfaces. The fifth lens L5 is a biconvex lens having a positive refractive power, and both of an object-side surface S10 and an image-side surface S11 thereof are convex surfaces. In addition, the fifth lens L5 is an aspherical lens, and the object-side surface S10 and the image-side surface S11 thereof are aspherical surfaces. The sixth lens L6 is a biconcave lens having a negative refractive power, and both of an object-side surface S11 and an image-side surface S12 thereof are concave surfaces. In addition, the sixth lens L6 is an aspherical lens, and the object-side surface S11 and the image-side surface S12 thereof are aspherical surfaces. The fifth lens L5 and the sixth lens L6 are glued together to form a cemented lens. The seventh lens L7 is a biconvex lens having a positive refractive power, and both of an object-side surface S13 and an image-side surface S14 thereof are convex surfaces. In addition, the seventh lens L7 is an aspherical lens, and the object-side surface S13 and the image-side surface S14 thereof are aspherical surfaces.

Optionally, the optical lens assembly may further include a optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 (i.e., between the fourth lens L4 and the cemented lens) to improve image quality.

Table 1 shows radius of curvature R, thickness T, refractive index Nd, and Abbe number Vd of each lens of the optical lens assembly of Example 1, wherein the units of radius of curvature R and thickness T are both millimeters (mm).

TABLE 1

| Surface No. | Radius of Curvature R | Thickness T | Refractive Index Nd | Abbe Number Vd |
|---|---|---|---|---|
| 1 | 10.2000 | 1.0000 | 1.77 | 49.61 |
| 2 | 3.8000 | 2.9200 | | |
| 3 | 19.3000 | 0.5000 | 1.77 | 49.61 |
| 4 | 2.4000 | 1.3000 | | |
| 5 | −25.9000 | 0.8500 | 1.54 | 56.00 |
| 6 | 4.5000 | 0.4000 | | |
| 7 | 4.7000 | 2.4000 | 1.92 | 20.88 |
| 8 | −23.4000 | 0.2440 | | |
| STO | Infinite | 0.1740 | | |
| 10 | 4.4000 | 2.1000 | 1.54 | 56.00 |
| 11 | −1.8000 | 0.5800 | 1.64 | 23.53 |
| 12 | 10.0000 | 0.5580 | | |
| 13 | 3.3000 | 2.5000 | 1.59 | 61.16 |
| 14 | −4.7000 | 0.1000 | | |
| 15 | Infinite | 0.5500 | 1.52 | 64.21 |
| 16 | Infinite | 0.5000 | | |
| 17 | Infinite | 0.4000 | 1.52 | 64.21 |
| 18 | Infinite | 2.2000 | | |
| IMA | Infinite | | | |

The present example employs seven lenses as an example. By properly distributing the refractive power and surface type of each lens, the center thickness of each lens, and the air gap between the lenses, the lens assembly may have at least one of the beneficial effects of miniaturization, high resolution, low cost, small front end aperture, and good temperature performance. The surface types Z of each aspherical is defined by the following formula:

$$Z(h) = \frac{ch^2}{1 + \sqrt{1 - (k+1)c^2h^2}} + Ah^4 + Bh^6 + Ch^8 + Dh^{10} + Eh^{12} \tag{1}$$

Where, Z is the sag—the axis-component of the displacement of the surface from the aspheric vertex, when the surface is at height h from the optical axis; c is a paraxial curvature of the aspheric, c=1/R (that is, the paraxial curvature c is reciprocal of the radius of curvature R in the above Table 1); k is a conic coefficient; and A, B, C, D, E are high-order coefficients. Table 2 below shows the conic coefficient k and the high-order coefficients A、B、C、D and E applicable to aspheric surfaces S5, S6 and S10-14 in Example 1.

TABLE 2

| Surface No. | K | A | B | C | D | E |
|---|---|---|---|---|---|---|
| 5 | 0.0000 | −7.7679E−03 | 5.7406E−04 | 1.0166E−04 | 4.9333E−06 | −3.3705E−07 |
| 6 | −5.2609 | −2.2839E−04 | −2.3626E−03 | 1.7896E−03 | −4.3271E−04 | 8.7120E−05 |
| 10 | 0.0000 | 1.7843E−03 | −3.6582E−03 | 4.7222E−03 | −1.9787E−03 | 1.5540E−04 |

TABLE 2-continued

| Surface No. | K | A | B | C | D | E |
|---|---|---|---|---|---|---|
| 11 | 0.0000 | −6.9696E−02 | 2.7876E−02 | −1.5212E−02 | 5.4528E−03 | −1.7209E−03 |
| 12 | 0.0000 | −3.0812E−02 | 1.0730E−02 | −2.7698E−03 | 5.1930E−04 | −2.0319E−05 |
| 13 | −6.8067 | −4.4136E−03 | 7.7472E−04 | −3.8967E−04 | 7.9255E−05 | −8.9638E−06 |
| 14 | 0.0000 | 2.0513E−03 | −1.7451E−04 | −3.3349E−05 | 2.0447E−06 | 3.5016E−07 |

Table 3 below shows a total focal length F of the optical lens assembly, a refractive index Nd1 of a material of the first lens L1, a radius of curvature r31 of the object-side surface S5 of the third lens L3, a radius of curvature r32 of the image-side surface S6 of the third lens L3, a center thickness d3 of the third lens L3, a maximum effective aperture D of the object-side surface S1 of the first lens L1 corresponding to a maximum field-of-view of the optical lens assembly, an image height 2h corresponding to the maximum field-of-view of the optical lens assembly, a maximum field-of-view FOV of the optical lens assembly, an optical back focus length BFL of the optical lens assembly (i.e. an axial distance from a center of the image-side surface S14 of the seventh lens L7, the last lens, to the imaging plane S19) and a total track length TTL of the optical lens assembly (i.e. an axial distance from a center of the object-side surface S1 of the first lens L1 to the imaging plane S19) in Example 1.

TABLE 3

| F (mm) | 1.517 | h (mm) | 5.216 |
|---|---|---|---|
| Nd1 | 1.77 | FOV (°) | 196 |
| |r31| (mm) | 25.900 | BFL (mm) | 3.750 |
| |r32| (mm) | 4.500 | TTL (mm) | 19.276 |
| d3 (mm) | 0.850 | | |
| D (mm) | 13.830 | | |

In the present example, the radius of curvature r31 of the object-side surface S5 of the third lens L3, the radius of curvature r32 of the image-side surface S6 of the third lens L3 and the center thickness d3 of the third lens L3 satisfy (|r31|+d3)/|r32|=5.944; the maximum field-of-view FOV of the optical lens assembly, the maximum effective aperture D of the object-side surface S1 of the first lens L1 corresponding to the maximum field-of-view of the optical lens assembly and the image height 2h corresponding to the maximum field-of-view of the optical lens assembly satisfy D/2h/FOV=0.014; the optical back focus length BFL of the optical lens assembly and the total track length TTL of the optical lens assembly satisfy BFL/TTL=0.195; and the total track length TTL of the optical lens assembly, the image height 2h corresponding to the maximum field-of-view of the optical lens assembly and the maximum field-of-view FOV of the optical lens assembly satisfy TTL/2h/FOV=0.019.

Example 2

Figure 2:
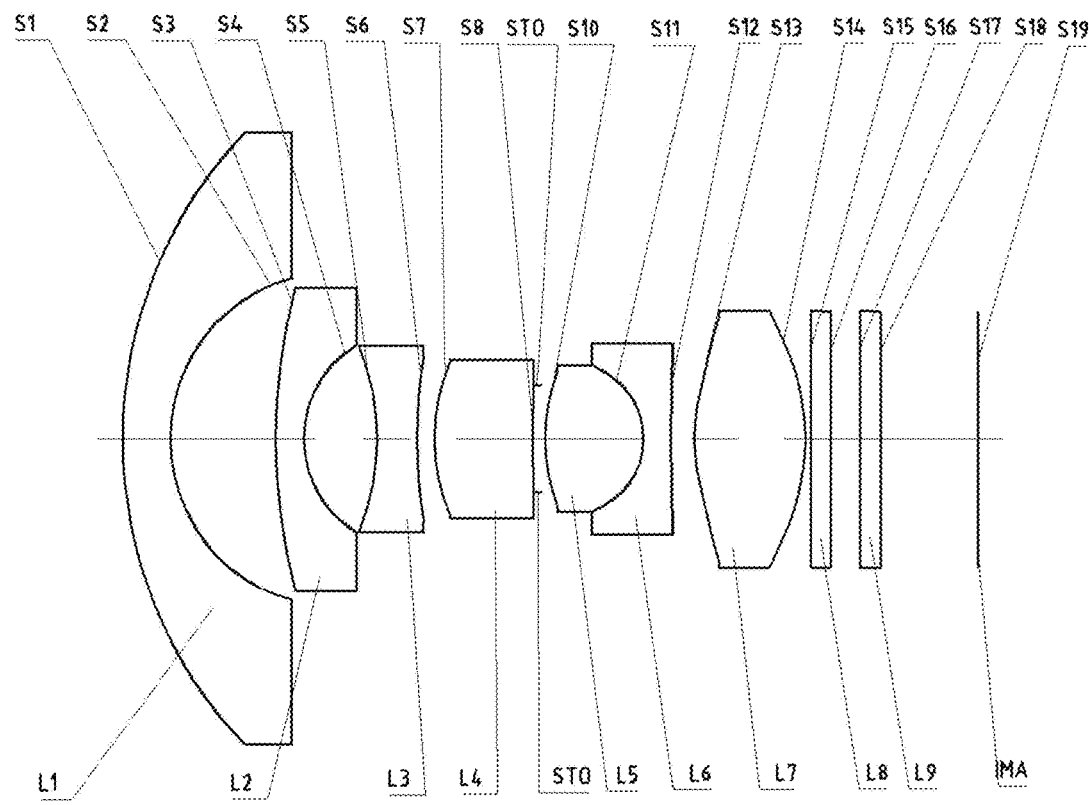
FIG. 2 illustrates a schematic structural view of an optical lens assembly according to Example 2 of the present disclosure.

An optical lens assembly according to Example 2 of the present disclosure is described below with reference to FIG. 2. In this example and the following examples, for the purpose of brevity, the description of parts similar to those in Example 1 will be omitted. FIG. 2 is a schematic structural view showing an optical lens assembly according to Example 2 of the present disclosure.

As shown in FIG. 2, the optical lens assembly includes a first lens L1, a second lens L2, a third lens L3, a fourth lens L4, a fifth lens L5, a sixth lens L6 and a seventh lens L7, sequentially from an object side to an image side along an optical axis.

The first lens L1 is a meniscus lens having a negative refractive power, an object-side surface S1 thereof is a convex surface, and an image-side surface S2 thereof is a concave surface. The second lens L2 is a meniscus lens having a negative refractive power, an object-side surface S3 thereof is a convex surface, and an image-side surface S4 thereof is a concave surface. The third lens L3 is a biconcave lens having a negative refractive power, and both of an object-side surface S5 and an image-side surface S6 thereof are concave surfaces. In addition, the third lens L3 is an aspherical lens, and the object-side surface S5 and the image-side surface S6 thereof are aspherical surfaces. The fourth lens L4 is a meniscus lens having a positive refractive power, an object-side surface S7 thereof is a convex surface, and an image-side surface S8 thereof is a concave surface. The fifth lens L5 is a biconvex lens having a positive refractive power, and both of an object-side surface S10 and an image-side surface S11 thereof are convex surfaces. In addition, the fifth lens L5 is an aspherical lens, and the object-side surface S10 and the image-side surface S11 thereof are aspherical surfaces. The sixth lens L6 is a biconcave lens having a negative refractive power, and both of an object-side surface S11 and an image-side surface S12 thereof are concave surfaces. In addition, the sixth lens L6 is an aspherical lens, and the object-side surface S11 and the image-side surface S12 thereof are aspherical surfaces. The fifth lens L5 and the sixth lens L6 are glued together to form a cemented lens. The seventh lens L7 is a biconvex lens having a positive refractive power, and both of an object-side surface S13 and an image-side surface S14 thereof are convex surfaces. In addition, the seventh lens L7 is an aspherical lens, and the object-side surface S13 and the image-side surface S14 thereof are aspherical surfaces.

Optionally, the optical lens assembly may further include a optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 (i.e., between the fourth lens L4 and the cemented lens) to improve image quality.

The present example employs seven lenses as an example. By properly distributing the refractive power and surface shape of each lens, the center thickness of each lens, and the air gap between the lenses, the lens assembly may have at least one of the beneficial effects of miniaturization, high resolution, low cost, small front end aperture, and good temperature performance.

Table 4 shows radius of curvature R, thickness T, refractive index Nd, and Abbe number Vd of each lens of the optical lens assembly of Example 2, wherein the units of radius of curvature R and thickness T are both millimeters (mm). Table 5 below shows the conic coefficient k and the high-order coefficients A、B、C、D and E applicable to aspheric surfaces S5, S6 and S10-14 in Example 2, wherein the surface type of each aspheric surface may be defined by the formula (1) given in the above Example 1. Table 6 below shows a total focal length F of the optical lens assembly, a refractive index Nd1 of a material of the first lens L1, a radius of curvature r31 of the object-side surface S5 of the third lens L3, a radius of curvature r32 of the image-side surface S6 of the third lens L3, a center thickness d3 of the third lens L3, a maximum effective aperture D of the object-side surface S1 of the first lens L1 corresponding to a maximum field-of-view of the optical lens assembly, an image height 2h corresponding to the maximum field-of-view of the optical lens assembly, a maximum field-of-view FOV of the optical lens assembly, an optical back focus length BFL of the optical lens assembly (i.e. an axial distance from a center of the image-side surface S14 of the seventh lens L7, the last lens, to the imaging plane S19) and a total track length TTL of the optical lens assembly (i.e. an axial distance from a center of the object-side surface S1 of the first lens L1 to the imaging plane S19) in Example 2.

In the present example, the radius of curvature r31 of the object-side surface S5 of the third lens L3, the radius of curvature r32 of the image-side surface S6 of the third lens L3 and the center thickness d3 of the third lens L3 satisfy (|r31|+d3)/|r32|=0.646; the maximum field-of-view FOV of the optical lens assembly, the maximum effective aperture D of the object-side surface S1 of the first lens L1 corresponding to the maximum field-of-view of the optical lens assembly and the image height 2h corresponding to the maximum field-of-view of the optical lens assembly satisfy D/2h/FOV=0.013; the optical back focus length BFL of the optical lens assembly and the total track length TTL of the optical lens assembly satisfy BFL/TTL=0.187; and the total track length TTL of the optical lens assembly, the image height 2h corresponding to the maximum field-of-view of the optical lens assembly and the maximum field-of-view FOV of the optical lens assembly satisfy TTL/2h/FOV=0.018.

Example 3

Figure 3:
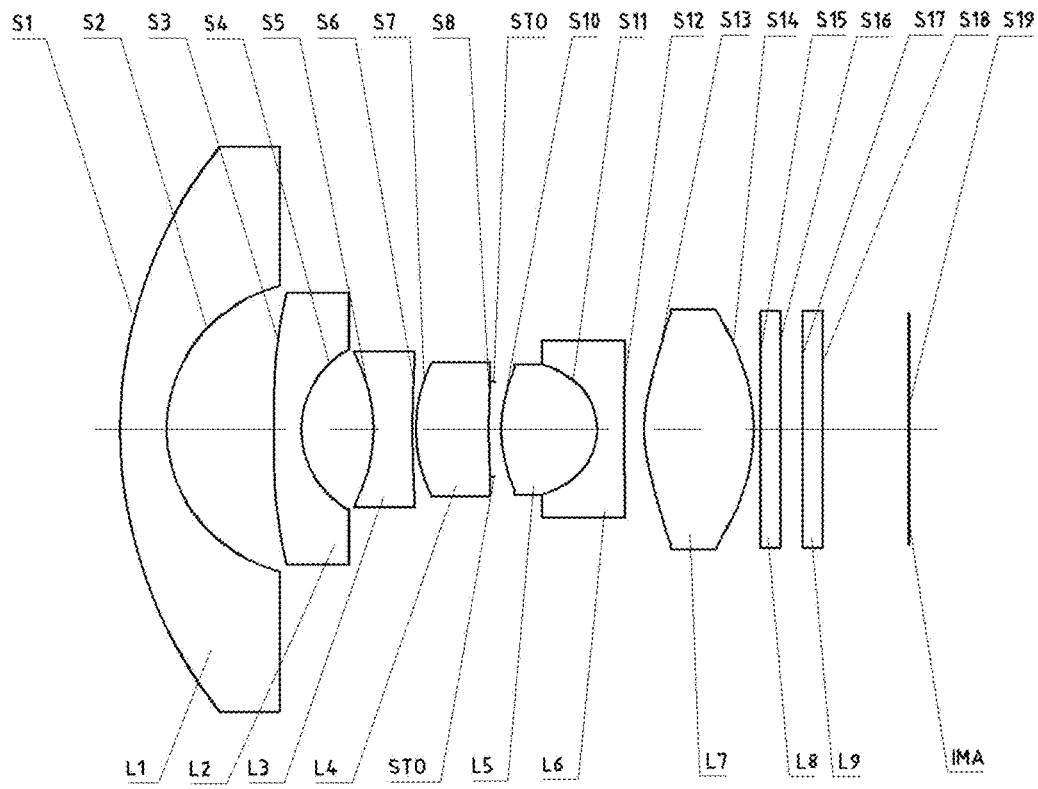
FIG. 3 illustrates a schematic structural view of an optical lens assembly according to Example 3 of the present disclosure.

An optical lens assembly according to Example 3 of the present disclosure is described below with reference to FIG. 3. In this example and the following examples, for the purpose of brevity, the description of parts similar to those in Example 1 will be omitted. FIG. 3 is a schematic structural view showing an optical lens assembly according to Example 3 of the present disclosure.

As shown in FIG. 3, the optical lens assembly includes a first lens L1, a second lens L2, a third lens L3, a fourth lens L4, a fifth lens L5, a sixth lens L6 and a seventh lens L7, sequentially from an object side to an image side along an optical axis.

The first lens L1 is a meniscus lens having a negative refractive power, an object-side surface S1 thereof is a convex surface, and an image-side surface S2 thereof is a concave surface. The second lens L2 is a meniscus lens having a negative refractive power, an object-side surface S3 thereof is a convex surface, and an image-side surface S4 thereof is a concave surface. In addition, the second lens L2 is an aspherical lens, and the object-side surface S3 and the image-side surface S4 thereof are aspherical surfaces. The third lens L3 is a biconcave lens having a negative refractive power, and both of an object-side surface S5 and an image-side surface S6 thereof are concave surfaces. In addition, the third lens L3 is an aspherical lens, and the object-side surface S5 and the image-side surface S6 thereof are aspherical surfaces. The fourth lens L4 is a meniscus lens having a positive refractive power, an object-side surface S7 thereof is a convex surface, and an image-side surface S8 thereof is a concave surface. The fifth lens L5 is a biconvex lens having a positive refractive power, and both of an object-side surface S10 and an image-side surface S11 thereof are convex surfaces. In addition, the fifth lens L5 is an aspherical lens, and the object-side surface S10 and the

TABLE 4

| Surface No. | Radius of Curvature R | Thickness T | Refractive Index Nd | Abbe Number Vd |
|---|---|---|---|---|
| 1 | 9.0000 | 1.0000 | 1.80 | 46.57 |
| 2 | 3.5000 | 2.2500 | | |
| 3 | 11.7000 | 0.6000 | 1.77 | 49.61 |
| 4 | 2.3000 | 1.5700 | | |
| 5 | −5.3000 | 0.8400 | 1.54 | 56.11 |
| 6 | 9.5000 | 0.4000 | | |
| 7 | 4.0000 | 2.1000 | 1.92 | 20.88 |
| 8 | 54.7000 | 0.1000 | | |
| STO | Infinite | 0.1500 | | |
| 10 | 3.5000 | 2.1000 | 1.54 | 56.11 |
| 11 | −1.8000 | 0.5800 | 1.64 | 23.53 |
| 12 | 10.6000 | 0.5000 | | |
| 13 | 3.3000 | 2.4000 | 1.59 | 61.16 |
| 14 | −4.5000 | 0.1000 | | |
| 15 | Infinite | 0.5500 | 1.52 | 64.17 |
| 16 | Infinite | 0.5000 | | |
| 17 | Infinite | 0.4000 | 1.52 | 64.17 |
| 18 | Infinite | 1.8000 | | |
| IMA | Infinite | | | |

TABLE 5

| Surface No. | K | A | B | C | D | E |
|---|---|---|---|---|---|---|
| 5 | 0 | −5.5352E−03 | 6.2754E−04 | 1.7277E−04 | −6.0125E−06 | −2.8063E−06 |
| 6 | −31.188548 | −1.4680E−03 | −1.9551E−03 | 1.7968E−03 | −4.2798E−04 | 8.7120E−05 |
| 10 | 0 | −5.1674E−03 | −3.0060E−03 | 4.5413E−03 | −1.9708E−03 | 1.5540E−04 |
| 11 | 0 | −6.7613E−02 | 2.0916E−02 | −1.1965E−02 | 4.6629E−03 | −4.3022E−04 |
| 12 | 0 | −3.0587E−02 | 1.0840E−02 | −2.7738E−03 | 5.0917E−04 | −8.1275E−05 |
| 13 | −7.161578 | −4.5768E−03 | 8.3462E−04 | −3.8943E−04 | 7.8644E−05 | −8.9361E−06 |
| 14 | 0 | 1.7889E−03 | −9.1603E−05 | −3.9052E−05 | 1.7705E−06 | 4.2037E−07 |

TABLE 6

| F (mm) | 1.493 | h (mm) | 5.030 |
|---|---|---|---|
| Nd1 | 1.8 | FOV (°) | 196 |
| |r31| (mm) | 5.300 | BFL (mm) | 3.350 |
| |r32| (mm) | 9.500 | TTL (mm) | 17.940 |
| d3 (mm) | 0.840 | | |
| D (mm) | 12.478 | | | image-side surface S11 thereof are aspherical surfaces. The sixth lens L6 is a biconcave lens having a negative refractive power, and both of an object-side surface S11 and an image-side surface S12 thereof are concave surfaces. In addition, the sixth lens L6 is an aspherical lens, and the object-side surface S11 and the image-side surface S12 thereof are aspherical surfaces. The fifth lens L5 and the sixth lens L6 are glued together to form a cemented lens. The seventh lens L7 is a biconvex lens having a positive refractive power, and both of an object-side surface S13 and an image-side surface S14 thereof are convex surfaces. In addition, the seventh lens L7 is an aspherical lens, and the object-side surface S13 and the image-side surface S14 thereof are aspherical surfaces.

Optionally, the optical lens assembly may further include a optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 (i.e., between the fourth lens L4 and the cemented lens) to improve image quality.

The present example employs seven lenses as an example. By properly distributing the refractive power and surface shape of each lens, the center thickness of each lens, and the air gap between the lenses, the lens assembly may have at least one of the beneficial effects of miniaturization, high resolution, low cost, small front end aperture, and good temperature performance.

Table 7 shows radius of curvature R, thickness T, refractive index Nd, and Abbe number Vd of each lens of the optical lens assembly of Example 3, wherein the units of radius of curvature R and thickness T are both millimeters (mm). Table 8 below shows the conic coefficient k and the high-order coefficients A、B、C、D and E applicable to aspheric surfaces S3-S6 and S10-14 in Example 3, wherein the surface type of each aspheric surface may be defined by the formula (1) given in the above Example 1. Table 9 below shows a total focal length F of the optical lens assembly, a refractive index Nd1 of a material of the first lens L1, a radius of curvature r31 of the object-side surface S5 of the third lens L3, a radius of curvature r32 of the image-side surface S6 of the third lens L3, a center thickness d3 of the third lens L3, a maximum effective aperture D of the object-side surface S1 of the first lens L1 corresponding to a maximum field-of-view of the optical lens assembly, an image height 2h corresponding to the maximum field-of-view of the optical lens assembly, a maximum field-of-view FOV of the optical lens assembly, an optical back focus length BFL of the optical lens assembly (i.e. an axial distance from a center of the image-side surface S14 of the seventh lens L7, the last lens, to the imaging plane S19) and a total track length TTL of the optical lens assembly (i.e. an axial distance from a center of the object-side surface S1 of the first lens L1 to the imaging plane S19) in Example 3.

TABLE 7

| Surface No. | Radius of Curvature R | Thickness T | Refractive Index Nd | Abbe Number Vd |
|---|---|---|---|---|
| 1 | 10.3000 | 1.0000 | 1.77 | 49.61 |
| 2 | 3.3000 | 2.3000 | | |
| 3 | 36.4000 | 0.6000 | 1.54 | 56.11 |
| 4 | 2.0000 | 1.5600 | | |
| 5 | −3.4000 | 0.8400 | 1.54 | 56.00 |
| 6 | 26.0000 | 0.0700 | | |
| 7 | 3.5000 | 1.5800 | 1.92 | 20.88 |
| 8 | 20.4000 | 0.1000 | | |
| STO | Infinite | 0.1500 | | |
| 10 | 3.0000 | 2.1000 | 1.54 | 56.00 |
| 11 | −1.6000 | 0.5800 | 1.64 | 23.53 |
| 12 | 12.3000 | 0.4600 | | |
| 13 | 3.2000 | 2.4000 | 1.59 | 61.16 |
| 14 | −4.0000 | 0.1000 | | |
| 15 | Infinite | 0.5500 | 1.52 | 64.21 |
| 16 | Infinite | 0.1000 | | |
| 17 | Infinite | 0.4000 | 1.52 | 64.21 |
| 18 | Infinite | 1.2000 | | |
| IMA | Infinite | | | |

TABLE 8

| Surface No. | K | A | B | C | D | E |
|---|---|---|---|---|---|---|
| 3 | 0.0000 | 2.4718E−03 | −2.2737E−05 | −9.0605E−06 | −5.2396E−07 | 9.0088E−08 |
| 4 | 0.0000 | 1.2019E−03 | −3.7074E−04 | 8.3937E−04 | −1.1458E−04 | −3.8856E−15 |
| 5 | 0.0000 | 1.4846E−03 | 1.6877E−03 | −7.0954E−05 | −6.8738E−05 | 9.3558E−06 |
| 6 | −778.4501 | 2.1543E−03 | −1.3294E−03 | 1.2485E−03 | −3.3753E−04 | 4.3560E−05 |
| 10 | 0.0000 | −1.2827E−02 | −1.4919E−04 | 3.0007E−03 | −3.1310E−03 | 3.1080E−04 |
| 11 | 0.0000 | −5.2983E−02 | 3.9616E−03 | −1.9028E−03 | 2.9815E−03 | −4.3022E−04 |
| 12 | 0.0000 | −2.9858E−02 | 1.0882E−02 | −2.7895E−03 | 5.3184E−04 | −9.0565E−05 |
| 13 | −7.368392 | −3.6104E−03 | 8.2765E−04 | −3.9850E−04 | 3.8968E−05 | −4.3137E−06 |
| 14 | 0.0000 | 3.7122E−03 | −4.1116E−05 | −5.3617E−05 | 6.7947E−07 | 2.1656E−06 |

TABLE 9

| F (mm) | 1.510 | h (mm) | 5.318 |
|---|---|---|---|
| Nd1 | 1.77 | FOV (°) | 196 |
| |r31| (mm) | 3.400 | BFL (mm) | 2.350 |
| |r32| (mm) | 26.000 | TTL (mm) | 16.090 |
| d3 (mm) | 0.840 | | |
| D (mm) | 12.658 | | |

In the present example, the radius of curvature r31 of the object-side surface S5 of the third lens L3, the radius of curvature r32 of the image-side surface S6 of the third lens L3 and the center thickness d3 of the third lens L3 satisfy (|r31|+d3)/|r32|=0.163; the maximum field-of-view FOV of the optical lens assembly, the maximum effective aperture D of the object-side surface S1 of the first lens L1 corresponding to the maximum field-of-view of the optical lens assembly and the image height 2h corresponding to the maximum field-of-view of the optical lens assembly satisfy D/2h/FOV=0.012; the optical back focus length BFL of the optical lens assembly and the total track length TTL of the optical lens assembly satisfy BFL/TTL=0.146; and the total track length TTL of the optical lens assembly, the image height 2h corresponding to the maximum field-of-view of the optical lens assembly and the maximum field-of-view FOV of the optical lens assembly satisfy TTL/2h/FOV=0.015.

Example 4

Figure 4:
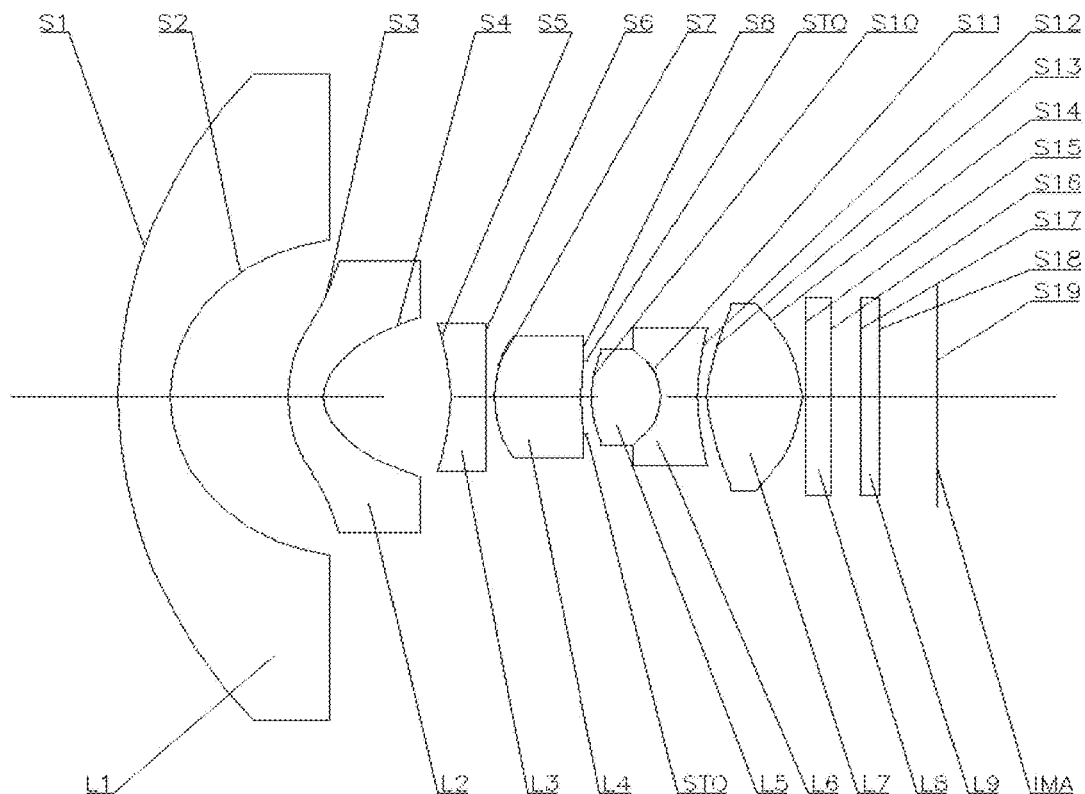
FIG. 4 illustrates a schematic structural view of an optical lens assembly according to Example 4 of the present disclosure.

An optical lens assembly according to Example 4 of the present disclosure is described below with reference to FIG. 4. FIG. 4 is a schematic structural view showing an optical lens assembly according to Example 4 of the present disclosure.

As shown in FIG. 4, the optical lens assembly includes a first lens L1, a second lens L2, a third lens L3, a fourth lens L4, a fifth lens L5, a sixth lens L6 and a seventh lens L7, sequentially from an object side to an image side along an optical axis.

The first lens L1 is a meniscus lens having a negative refractive power with a convex surface toward the object side, an object-side surface S1 thereof is a convex surface, and an image-side surface S2 thereof is a concave surface. The second lens L2 is a meniscus lens having a negative refractive power with a convex surface toward the object side, an object-side surface S3 thereof is a convex surface, and an image-side surface S4 thereof is a concave surface. The third lens L3 is a meniscus lens having a negative refractive power with a convex surface toward the image side, an object-side surface S5 thereof is a concave surface, and an image-side surface S6 thereof is a convex surface. The fourth lens L4 is a meniscus lens having a positive refractive power with a convex surface toward the object side, an object-side surface S7 thereof is a convex surface, and an image-side surface S8 thereof is a concave surface. The fifth lens L5 is a biconvex lens having a positive refractive power, and both of an object-side surface S10 and an image-side surface S11 thereof are convex surfaces. The sixth lens L6 is a biconcave lens having a negative refractive power, and both of an object-side surface S11 and an image-side surface S12 are concave surfaces. The seventh lens L7 is a biconvex lens having a positive refractive power, and both of an object-side surface S13 and an image-side surface S14 thereof are convex surfaces.

In the present example, the second lens L2, the third lens L3, the fifth lens L5, the sixth lens L6 and the seventh lens L7 are aspherical lenses. The fifth lens L5 and the sixth lens L6 are cemented together, and therefore the image-side surface S11 of the fifth lens L5 and the object-side surface S11 of the sixth lens L6 are the same surface.

A optical filter L8 is disposed behind the seventh lens L7, and the optical filter L8 has an object-side surface S15 and an image-side surface S16. A protective glass L9 is disposed behind the optical filter L8, and the protective glass L9 has an object-side surface S17 and an image-side surface S18. An imaging plane IMA (i.e. imaging plane S19) is disposed behind the protective glass L9 to receive an image formed by the optical system.

Optionally, a stop STO is disposed between the fourth lens L4 and a cemented lens formed by the fifth lens L5 and the sixth lens L6 to gather the front and rear light, shorten the total length of the optical system, reduce the aperture of the front and rear lens groups, and improve the imaging quality.

Table 10 shows surface parameters of each lens of the optical lens assembly of Example 4, including radius of curvature R, thickness T, refractive index Nd, and Abbe number Vd, wherein the units of radius of curvature R and thickness T are both millimeters (mm).

TABLE 10

| Surface No. | Radius of Curvature | Thickness T | Refractive Index Nd | Abbe Number Vd |
|---|---|---|---|---|
| 1 | 11.0000 | 1.1000 | 1.77 | 49.6 |
| 2 | 3.0000 | 1.5620 | | |
| 3 | 4.0000 | 0.7000 | 1.51 | 56.3 |
| 4 | 1.0000 | 1.8500 | | |
| 5 | −4.0000 | 0.7000 | 1.54 | 56.0 |
| 6 | −21.0000 | 0.1000 | | |
| 7 | 3.0000 | 1.8000 | 1.92 | 20.9 |
| 8 | 9.0000 | 0.0800 | | |
| STO | Infinite | 0.0900 | | |
| 10 | 3.0000 | 1.5500 | 1.54 | 56.0 |
| 11 | −1.5000 | 0.6000 | 1.64 | 23.5 |
| 12 | 3.5000 | 0.1000 | | |
| 13 | 2.0000 | 2.2000 | 1.54 | 56.0 |
| 14 | −2.0000 | 0.1000 | | |
| 15 | Infinite | 0.5500 | 1.52 | 64.2 |
| 16 | Infinite | 0.5000 | | |
| 17 | Infinite | 0.4000 | 1.52 | 64.2 |
| 18 | Infinite | 1.0000 | | |
| IMA | Infinite | | | |

Table 11 shows the conic coefficient K and the high-order coefficients A、B、C、D and E applicable to aspheric surfaces S3, S4, S5, S6, S10, S11, S12, S13 and S14 in the present example, wherein the surface type of each aspheric surface may be defined by the formula (1) given in the above Example 1.

TABLE 11

| Surface No. | K | A | B | C | D | E |
|---|---|---|---|---|---|---|
| 3 | −0.4480 | 5.7466E−03 | −3.0682E−03 | −1.0815E−05 | 5.2732E−06 | −2.7859E−08 |
| 4 | −0.8665 | 2.3826E−02 | 5.9123E−03 | −3.5102E−03 | 1.0671E−03 | −3.0260E−04 |
| 5 | −4.7919 | 1.9931E−02 | 5.9832E−04 | −1.5765E−03 | 6.0019E−04 | −4.9021E−05 |
| 6 | −463.0000 | 1.5663E−02 | 1.0425E−03 | −1.7845E−03 | 3.0580E−04 | 1.5132E−05 |
| 10 | 4.7077 | −3.0965E−02 | −3.4241E−02 | 1.3344E−02 | 7.9788E−03 | −2.8327E−02 |
| 11 | 0.2228 | −6.9637E−02 | −5.7548E−02 | 7.4466E−02 | −2.7338E−02 | −1.8730E−02 |
| 12 | −68.2485 | −1.6885E−02 | 1.8136E−02 | −3.5157E−03 | −6.2626E−04 | 1.3538E−04 |
| 13 | −14.5433 | −1.7594E−03 | 1.0558E−03 | 8.5322E−05 | −3.7938E−05 | 2.3427E−06 |
| 14 | −1.8063 | −1.3947E−03 | −1.3218E−03 | 3.2079E−04 | −9.3842E−05 | 1.5849E−05 |

Table 12 shows a total focal length F of the optical lens assembly, a refractive index Nd1 of a material forming the first lens L1 of the optical lens assembly, a radius of curvature r41 of the object-side surface of the fourth lens of the optical lens assembly, a radius of curvature r42 of the image-side surface of the fourth lens of the optical lens assembly, a center thickness d4 of the fourth lens of the optical lens assembly, a maximum effective aperture D of the object-side surface of the first lens corresponding to a maximum field-of-view of the optical lens assembly, an image height 2h corresponding to the maximum field-of-view of the optical lens assembly, a maximum field-of-view FOV of the optical lens assembly, an optical back focus length BFL of the optical lens assembly (i.e. a distance from a center of the image-side surface S14 of the seventh lens L7 of the optical lens assembly to the imaging plane IMA of the optical lens assembly) and a total track length TTL of the optical lens assembly (i.e. a distance from a center of the object-side surface S1 of the first lens L1 of the optical lens assembly to the imaging plane IMA of the optical lens assembly) in the present example.

TABLE 12

| Parameter | F (mm) | Nd1 | |r41| (mm) | |r42| (mm) | d4 (mm) |
|---|---|---|---|---|---|
| Value | 1.139 | 1.77 | 3.000 | 9.000 | 1.800 |
| Parameter | D (mm) | h (mm) | FOV (°) | BFL (mm) | TTL (mm) |
| Value | 10.528 | 3.986 | 194 | 2.550 | 14.982 |

In the present example, the radius of curvature r41 of the object-side surface of the fourth lens of the optical lens assembly, the radius of curvature r42 of the image-side surface of the fourth lens of the optical lens assembly and the center thickness d4 of the fourth lens of the optical lens assembly satisfy (|r41|+d4)/|r42|=0.533; the maximum effective aperture D of the object-side surface of the first lens corresponding to a maximum field-of-view of the optical lens assembly, the image height 2h corresponding to the maximum field-of-view of the optical lens assembly and the maximum field-of-view FOV of the optical lens assembly satisfy D/2h/FOV=0.014; the optical back focus length BFL of the optical lens assembly and the total track length TTL of the optical lens assembly satisfy BFL/TTL=0.170; the total track length TTL of the optical lens assembly, the image height 2h corresponding to the maximum field-of-view of the optical lens assembly and the maximum field-of-view FOV of the optical lens assembly satisfy TTL/2h/FOV=0.019.

Example 5

Figure 5:
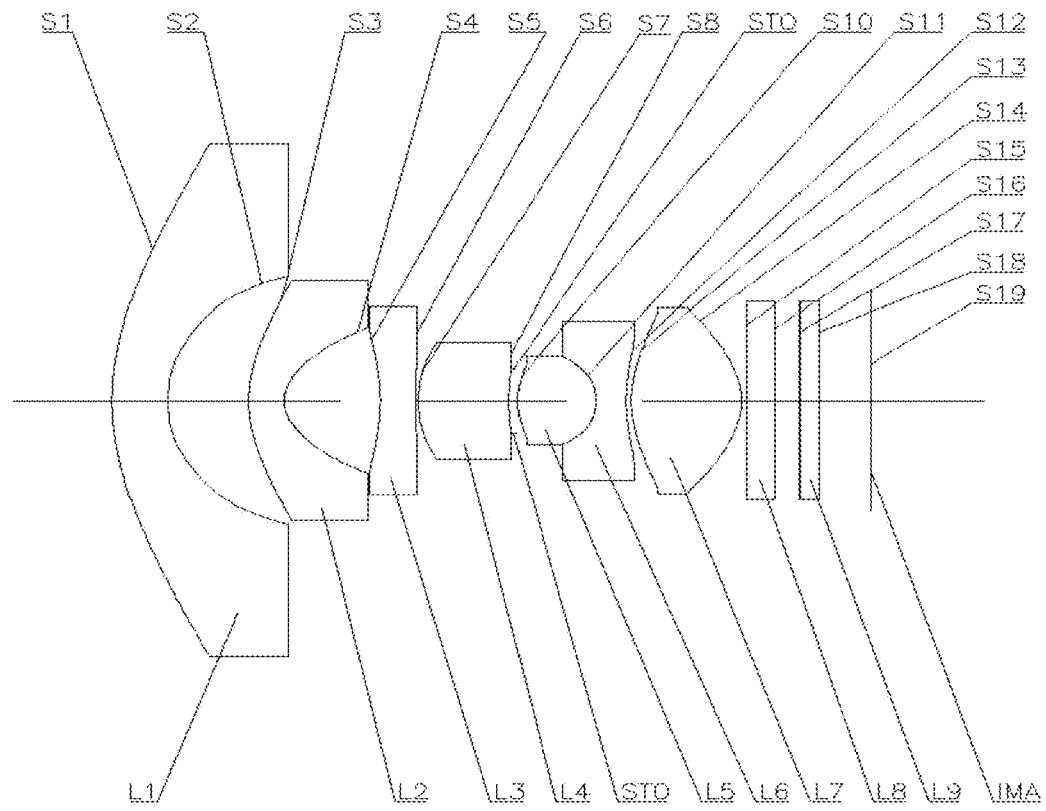
FIG. 5 illustrates a schematic structural view of an optical lens assembly according to Example 5 of the present disclosure.

An optical lens assembly according to Example 5 of the present disclosure is described below with reference to FIG. 5. FIG. 5 is a schematic structural view showing an optical lens assembly according to Example 5 of the present disclosure.

As shown in FIG. 5, the optical lens assembly includes a first lens L1, a second lens L2, a third lens L3, a fourth lens L4, a fifth lens L5, a sixth lens L6 and a seventh lens L7, sequentially from an object side to an image side along an optical axis.

The first lens L1 is a meniscus lens having a negative refractive power with a convex surface toward the object side, an object-side surface S1 thereof is a convex surface, and an image-side surface S2 thereof is a concave surface. The second lens L2 is a meniscus lens having a negative refractive power with a convex surface toward the object side, an object-side surface S3 thereof is a convex surface, and an image-side surface S4 thereof is a concave surface. The third lens L3 is a meniscus lens having a negative refractive power with a convex surface toward the image side, an object-side surface S5 thereof is a concave surface, and an image-side surface S6 thereof is a convex surface. The fourth lens L4 is a meniscus lens having a positive refractive power with a convex surface toward the object side, an object-side surface S7 thereof is a convex surface, and an image-side surface S8 thereof is a concave surface. The fifth lens L5 is a biconvex lens having a positive refractive power, and both of an object-side surface S10 and an image-side surface S11 thereof are convex surfaces. The sixth lens L6 is a biconcave lens having a negative refractive power, and both of an object-side surface S11 and an image-side surface S12 are concave surfaces. The seventh lens L7 is a biconvex lens having a positive refractive power, and both of an object-side surface S13 and an image-side surface S14 thereof are convex surfaces.

In the present example, the second lens L2, the third lens L3, the fifth lens L5, the sixth lens L6 and the seventh lens L7 are aspherical lenses. The fifth lens L5 and the sixth lens L6 are cemented together, and therefore the image-side surface S11 of the fifth lens L5 and the object-side surface S11 of the sixth lens L6 are the same surface.

A optical filter L8 is disposed behind the seventh lens L7, and the optical filter L8 has an object-side surface S15 and an image-side surface S16. A protective glass L9 is disposed behind the optical filter L8, and the protective glass L9 has an object-side surface S17 and an image-side surface S18. An imaging plane IMA (i.e. imaging plane S19) is disposed behind the protective glass L9 to receive an image formed by the optical system.

Optionally, a stop STO is disposed between the fourth lens L4 and a cemented lens formed by the fifth lens L5 and the sixth lens L6 to gather the front and rear light, shorten the total length of the optical system, reduce the aperture of the front and rear lens groups, and improve the imaging quality.

Table 13 shows surface parameters of each lens of the optical lens assembly of Example 5, including radius of curvature R, thickness T, refractive index Nd, and Abbe number Vd, wherein the units of radius of curvature R and thickness T are both millimeters (mm).

TABLE 13

| Surface No. | Radius of Curvature R | Thickness T | Refractive Index Nd | Abbe Number Vd |
|---|---|---|---|---|
| 1 | 12.5000 | 1.1000 | 1.79 | 47.5 |
| 2 | 4.0000 | 2.6000 | | |
| 3 | 4.0000 | 0.7500 | 1.51 | 57.0 |
| 4 | 1.0000 | 2.6000 | | |
| 5 | −3.5000 | 0.7500 | 1.51 | 57.0 |
| 6 | −21.0000 | 0.1000 | | |
| 7 | 3.0000 | 1.8400 | 1.92 | 20.9 |
| 8 | 7.5000 | 0.0400 | | |
| STO | Infinite | 0.2000 | | |
| 10 | 3.0000 | 1.5000 | 1.54 | 56.1 |
| 11 | −1.5000 | 0.7600 | 1.64 | 23.5 |
| 12 | 3.5000 | 0.1300 | | |
| 13 | 2.0000 | 2.0000 | 1.54 | 56.1 |
| 14 | −2.5000 | 0.1000 | | |
| 15 | Infinite | 0.5500 | 1.52 | 64.2 |
| 16 | Infinite | 0.5000 | | |
| 17 | Infinite | 0.4000 | 1.52 | 64.2 |
| 18 | Infinite | 1.3000 | | |
| IMA | Infinite | | | |

Table 14 shows the conic coefficient K and the high-order coefficients A、B、C、D and E applicable to aspheric surfaces S3, S4, S5, S6, S10, S11, S12, S13 and S14 in the present example, wherein the surface type of each aspheric surface may be defined by the formula (1) given in the above Example 1.

TABLE 14

| Surface No. | K | A | B | C | D | E |
|---|---|---|---|---|---|---|
| 3 | −0.4717 | 4.6273E−03 | −1.0353E−03 | −7.4783E−06 | 2.3617E−06 | −2.2183E−09 |
| 4 | −0.8333 | 2.2495E−02 | 3.8912E−03 | −1.8828E−03 | 5.6859E−04 | −1.2572E−04 |
| 5 | −5.6092 | 1.4467E−02 | −1.4289E−04 | −8.3730E−04 | 2.8505E−04 | −5.7600E−05 |
| 6 | −313.4015 | 1.1565E−02 | −6.8560E−05 | −1.0871E−03 | 1.1942E−04 | −6.2988E−06 |
| 10 | 4.5545 | −3.0395E−02 | −2.6845E−02 | 5.9662E−03 | 2.4265E−03 | −5.2557E−02 |
| 11 | −0.2766 | −4.6398E−02 | −6.6439E−03 | 3.8912E−02 | −1.6296E−02 | −9.4646E−04 |
| 12 | −47.0427 | −1.3764E−02 | 1.1874E−02 | −1.9899E−03 | −1.9750E−04 | 5.5985E−05 |
| 13 | −12.1656 | −1.5222E−03 | 5.4344E−04 | 1.7183E−05 | −1.5218E−05 | 4.1142E−06 |
| 14 | −1.9601 | −1.2287E−03 | −1.0152E−03 | 1.7267E−04 | −4.2909E−05 | 6.7474E−06 |

Table 15 shows a total focal length F of the optical lens assembly, a refractive index Nd1 of a material forming the first lens L1 of the optical lens assembly, a radius of curvature r41 of the object-side surface of the fourth lens of the optical lens assembly, a radius of curvature r42 of the image-side surface of the fourth lens of the optical lens assembly, a center thickness d4 of the fourth lens of the optical lens assembly, a maximum effective aperture D of the object-side surface of the first lens corresponding to a maximum field-of-view of the optical lens assembly, an image height 2h corresponding to the maximum field-of-view of the optical lens assembly, a maximum field-of-view FOV of the optical lens assembly, an optical back focus length BFL of the optical lens assembly (i.e. a distance from a center of the image-side surface S14 of the seventh lens L7 of the optical lens assembly to the imaging plane IMA of the optical lens assembly) and a total track length TTL of the optical lens assembly (i.e. a distance from a center of the object-side surface S1 of the first lens L1 of the optical lens assembly to the imaging plane IMA of the optical lens assembly) in the present example.

TABLE 15

| Parameter | F (mm) | Nd1 | |r41| (mm) | |r42| (mm) | d4 (mm) |
|---|---|---|---|---|---|
| Value | 1.213 | 1.79 | 3.000 | 7.500 | 1.840 |

| Parameter | D (mm) | h (mm) | FOV (°) | BFL (mm) | TTL (mm) |
|---|---|---|---|---|---|
| Value | 15.665 | 5.248 | 194 | 2.850 | 17.220 |

In the present example, the radius of curvature r41 of the object-side surface of the fourth lens of the optical lens assembly, the radius of curvature r42 of the image-side surface of the fourth lens of the optical lens assembly and the center thickness d4 of the fourth lens of the optical lens assembly satisfy (|r41|+d4)/|r42|=0.645; the maximum effective aperture D of the object-side surface of the first lens corresponding to a maximum field-of-view of the optical lens assembly, the image height 2h corresponding to the maximum field-of-view of the optical lens assembly and the maximum field-of-view FOV of the optical lens assembly satisfy D/2h/FOV=0.015; the optical back focus length BFL of the optical lens assembly and the total track length TTL of the optical lens assembly satisfy BFL/TTL=0.166; the total track length TTL of the optical lens assembly, the image height 2h corresponding to the maximum field-of-view of the optical lens assembly and the maximum field-of-view FOV of the optical lens assembly satisfy TTL/2h/FOV=0.017.

Example 6

Figure 6:
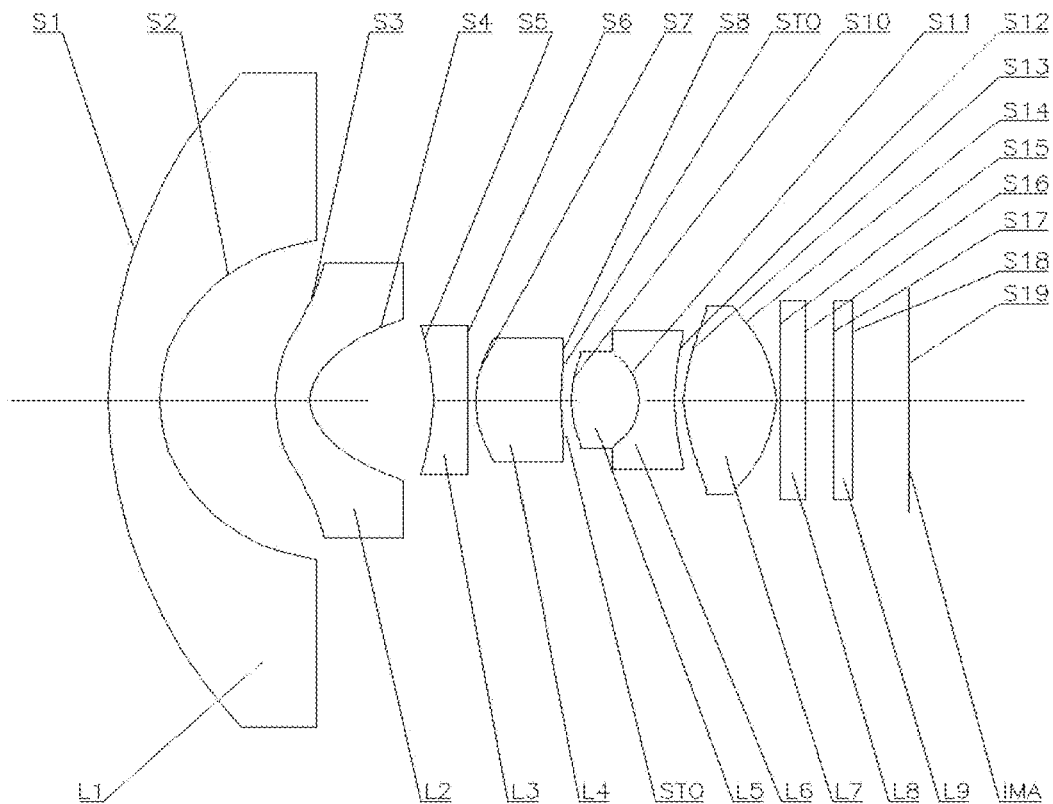
FIG. 6 illustrates a schematic structural view of an optical lens assembly according to Example 6 of the present disclosure.

An optical lens assembly according to Example 6 of the present disclosure is described below with reference to FIG. 6. FIG. 6 is a schematic structural view showing an optical lens assembly according to Example 6 of the present disclosure.

As shown in FIG. 6, the optical lens assembly includes a first lens L1, a second lens L2, a third lens L3, a fourth lens L4, a fifth lens L5, a sixth lens L6 and a seventh lens L7, sequentially from an object side to an image side along an optical axis.

The first lens L1 is a meniscus lens having a negative refractive power with a convex surface toward the object side, an object-side surface S1 thereof is a convex surface, and an image-side surface S2 thereof is a concave surface. The second lens L2 is a meniscus lens having a negative refractive power with a convex surface toward the object side, an object-side surface S3 thereof is a convex surface, and an image-side surface S4 thereof is a concave surface. The third lens L3 is a meniscus lens having a negative refractive power with a convex surface toward the image side, an object-side surface S5 thereof is a concave surface, and an image-side surface S6 thereof is a convex surface. The fourth lens L4 is a meniscus lens having a positive refractive power with a convex surface toward the object side, an object-side surface S7 thereof is a convex surface, and an image-side surface S8 thereof is a concave surface. The fifth lens L5 is a biconvex lens having a positive refractive power, and both of an object-side surface S10 and an image-side surface S11 thereof are convex surfaces. The sixth lens L6 is a biconcave lens having a negative refractive power, and both of an object-side surface S11 and an image-side surface S12 are concave surfaces. The seventh lens L7 is a biconvex lens having a positive refractive power, and both of an object-side surface S13 and an image-side surface S14 thereof are convex surfaces.

In the present example, the second lens L2, the third lens L3, the fifth lens L5, the sixth lens L6 and the seventh lens L7 are aspherical lenses. The fifth lens L5 and the sixth lens L6 are cemented together, and therefore the image-side surface S11 of the fifth lens L5 and the object-side surface S11 of the sixth lens L6 are the same surface.

A optical filter L8 is disposed behind the seventh lens L7, and the optical filter L8 has an object-side surface S15 and an image-side surface S16. A protective glass L9 is disposed behind the optical filter L8, and the protective glass L9 has an object-side surface S17 and an image-side surface S18. An imaging plane IMA (i.e. imaging plane S19) is disposed behind the protective glass L9 to receive an image formed by the optical system.

Optionally, a stop STO is disposed between the fourth lens L4 and a cemented lens formed by the fifth lens L5 and the sixth lens L6 to gather the front and rear light, shorten the total length of the optical system, reduce the aperture of the front and rear lens groups, and improve the imaging quality.

Table 16 shows surface parameters of each lens of the optical lens assembly of Example 6, including radius of curvature R, thickness T, refractive index Nd, and Abbe number Vd, wherein the units of radius of curvature R and thickness T are both millimeters (mm).

TABLE 16

| Surface No. | Radius of Curvature R | Thickness T | Refractive Index Nd | Abbe Number Vd |
|---|---|---|---|---|
| 1 | 16.3783 | 1.4570 | 1.82 | 46.6 |
| 2 | 5.7559 | 3.3385 | | |
| 3 | 24.1543 | 0.8742 | 1.54 | 56.1 |
| 4 | 2.6455 | 2.2693 | | |
| 5 | −4.8786 | 1.2289 | 1.54 | 56.1 |
| 6 | −137.3179 | 0.1011 | | |
| 7 | 5.5695 | 2.3029 | 1.92 | 20.9 |
| 8 | 15.0000 | 0.1457 | | |
| STO | Infinite | 0.2173 | | |
| 10 | 4.4565 | 3.0597 | 1.54 | 56.1 |
| 11 | −2.2998 | 0.8451 | 1.64 | 23.5 |
| 12 | 18.5610 | 0.6702 | | |
| 13 | 4.6118 | 3.4580 | 1.59 | 61.2 |
| 14 | −5.5551 | 0.1457 | | |
| 15 | Infinite | 0.5500 | 1.52 | 64.2 |
| 16 | Infinite | 1.8423 | | |
| 17 | Infinite | 0.4000 | 1.52 | 64.2 |
| 18 | Infinite | 0.5000 | | |
| IMA | Infinite | | | |

Table 17 shows the conic coefficient K and the high-order coefficients A、B、C、D and E applicable to aspheric surfaces S3, S4, S5, S6, S10, S11, S12, S13 and S14 in the present example, wherein the surface type of each aspheric surface may be defined by the formula (1) given in the above Example 1.

TABLE 17

| Surface No. | K | A | B | C | D | E |
|---|---|---|---|---|---|---|
| 3 | 0.0000 | 7.9913E−04 | 8.4205E−06 | −3.7147E−07 | −3.5378E−08 | 1.4341E−09 |
| 4 | 0.0000 | 3.3306E−04 | −1.4039E−04 | 5.5337E−05 | 3.5982E−06 | −6.1855E−17 |
| 5 | 0.0000 | 4.7999E−04 | 2.5703E−04 | −5.0903E−06 | −2.3229E−06 | 1.4893E−07 |
| 6 | −100.0000 | −1.8793E−03 | −2.6011E−05 | 6.4443E−05 | −1.1900E−05 | 6.9342E−07 |
| 10 | 0.0000 | −4.0510E−03 | −3.0595E−06 | 2.1935E−04 | −5.4714E−05 | 4.9476E−06 |
| 11 | 0.0000 | −1.8189E−02 | 7.6887E−04 | −1.4109E−04 | 1.4911E−04 | −1.3697E−05 |
| 12 | 0.0000 | −9.6677E−03 | 1.6647E−03 | −1.9979E−04 | 1.7899E−05 | −1.0813E−06 |
| 13 | −7.3684 | −1.1782E−03 | 1.2124E−04 | −2.8780E−05 | 2.6460E−06 | −6.8670E−08 |
| 14 | 0.0000 | 1.5256E−03 | −7.9888E−06 | −3.8422E−06 | 2.9943E−08 | 1.7237E−08 |

Table 18 shows a total focal length F of the optical lens assembly, a refractive index Nd1 of a material forming the first lens L1 of the optical lens assembly, a radius of curvature r41 of the object-side surface of the fourth lens of the optical lens assembly, a radius of curvature r42 of the image-side surface of the fourth lens of the optical lens assembly, a center thickness d4 of the fourth lens of the optical lens assembly, a maximum effective aperture D of the object-side surface of the first lens corresponding to a maximum field-of-view of the optical lens assembly, an image height 2h corresponding to the maximum field-of-view of the optical lens assembly, a maximum field-of-view FOV of the optical lens assembly, an optical back focus length BFL of the optical lens assembly (i.e. a distance from a center of the image-side surface S14 of the seventh lens L7 of the optical lens assembly to the imaging plane IMA of the optical lens assembly) and a total track length TTL of the optical lens assembly (i.e. a distance from a center of the object-side surface S1 of the first lens L1 of the optical lens assembly to the imaging plane IMA of the optical lens assembly) in the present example.

TABLE 18

| Parameter | F (mm) | Nd1 | |r41| (mm) | |r42| (mm) | d4 (mm) |
|---|---|---|---|---|---|
| Value | 2.255 | 1.82 | 5.569 | 15.000 | 2.303 |
| Parameter | D (mm) | h (mm) | FOV (°) | BFL (mm) | TTL (mm) |
| Value | 19.351 | 7.254 | 194 | 3.438 | 23.406 |

In the present example, the radius of curvature r41 of the object-side surface of the fourth lens of the optical lens assembly, the radius of curvature r42 of the image-side surface of the fourth lens of the optical lens assembly and the center thickness d4 of the fourth lens of the optical lens assembly satisfy (|r41|+d4)/|r42|=0.525; the maximum effective aperture D of the object-side surface of the first lens corresponding to a maximum field-of-view of the optical lens assembly, the image height 2h corresponding to the maximum field-of-view of the optical lens assembly and the maximum field-of-view FOV of the optical lens assembly satisfy D/2h/FOV=0.014; the optical back focus length BFL of the optical lens assembly and the total track length TTL of the optical lens assembly satisfy BFL/TTL=0.147; the total track length TTL of the optical lens assembly, the image height 2h corresponding to the maximum field-of-view of the optical lens assembly and the maximum field-of-view FOV of the optical lens assembly satisfy TTL/2h/FOV=0.017.

Example 7

Figure 7:
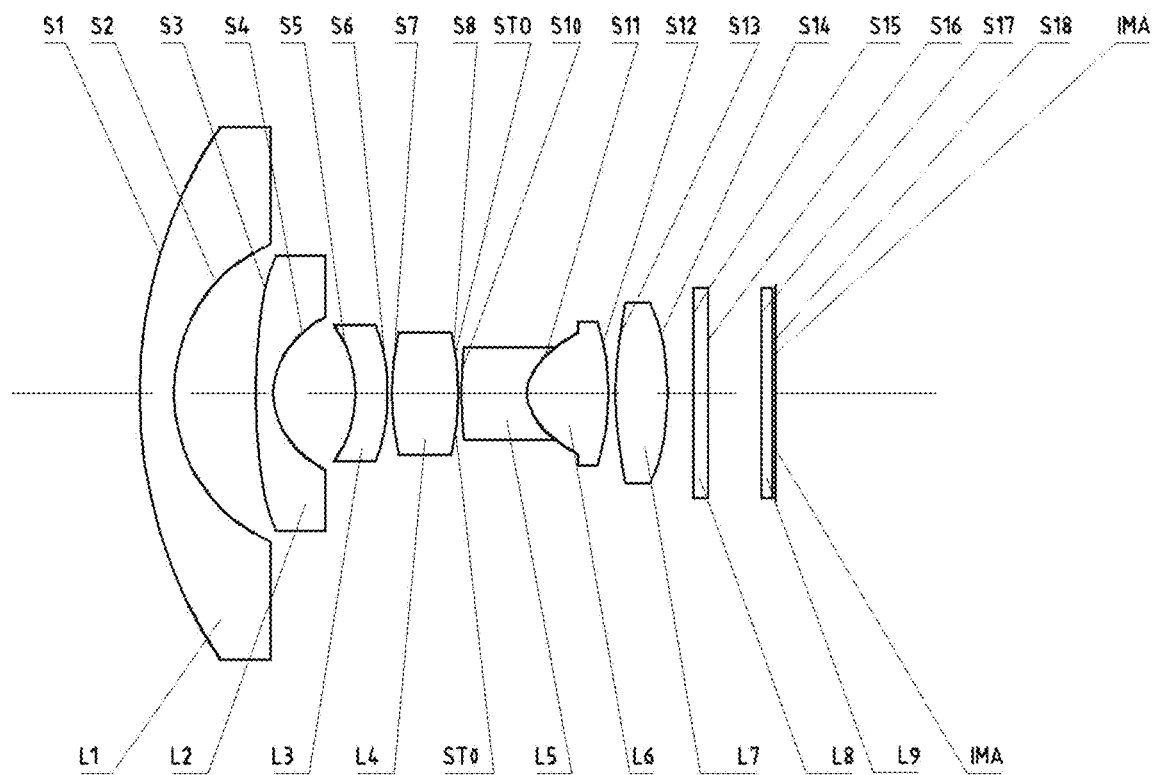
FIG. 7 illustrates a schematic structural view of an optical lens assembly according to Example 7 of the present disclosure.

An optical lens assembly according to Example 7 of the present disclosure is described below with reference to FIG. 7. FIG. 7 is a schematic structural view showing an optical lens assembly according to Example 7 of the present disclosure.

As shown in FIG. 7, the optical lens assembly includes a first lens L1, a second lens L2, a third lens L3, a fourth lens L4, a fifth lens L5, a sixth lens L6 and a seventh lens L7, sequentially from an object side to an image side along an optical axis.

The first lens L1 is a meniscus lens having a negative refractive power, an object-side surface S1 thereof is a convex surface, and an image-side surface S2 thereof is a concave surface. The second lens L2 is a meniscus lens having a negative refractive power, an object-side surface S3 thereof is a convex surface, and an image-side surface S4 thereof is a concave surface. The third lens L3 is a meniscus lens having a negative refractive power, an object-side surface S5 thereof is a concave surface, and an image-side surface S6 thereof is a convex surface. The fourth lens L4 is a biconvex lens having a positive refractive power, and both of an object-side surface S7 and an image-side surface S8 thereof are convex surfaces. The fifth lens L5 is a meniscus lens having a negative refractive power, an object-side surface S10 thereof is a convex surface, and an image-side surface S11 thereof is a concave surface. The sixth lens L6 is a biconvex lens having a positive refractive power, and both of an object-side surface S11 and an image-side surface S12 are convex surfaces. The fifth lens L5 and the sixth lens L6 are cemented together to form a cemented lens. The seventh lens L7 is a biconvex lens having a positive refractive power, and both of an object-side surface S13 and an image-side surface S14 thereof are convex surfaces.

Each of the second lens L2, the third lens L3, the fifth lens L5, the sixth lens L6 and the seventh lens L7 is an aspherical lens, and the respective object-side surface and image-side surface thereof are aspherical surfaces.

Optionally, the optical lens assembly may further include a optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 to improve image quality.

Table 19 shows radius of curvature R, thickness T, refractive index Nd, and Abbe number Vd of each lens of the optical lens assembly of Example 7, wherein the units of radius of curvature R and thickness T are both millimeters (mm).

TABLE 19

| Surface No. | Radius of Curvature R | Thickness T | Refractive Index Nd | Abbe Number Vd |
|---|---|---|---|---|
| 1 | 16.6528 | 1.3000 | 1.78 | 49.61 |
| 2 | 5.8229 | 3.1638 | | |
| 3 | 19.88 | 0.6700 | 1.52 | 56.98 |
| 4 | 2.4565 | 3.1552 | | |
| 5 | −5.2358 | 1.2400 | 1.54 | 56.11 |
| 6 | −10.2055 | 0.1448 | | |
| 7 | 9.3800 | 2.6000 | 1.85 | 23.79 |
| 8 | −9.3800 | −0.1024 | | |
| STO | Infinite | 0.2000 | | |
| 10 | 9.7229 | 2.5200 | 1.64 | 23.53 |
| 11 | 1.2856 | 3.1700 | 1.54 | 56.11 |
| 12 | −8.5820 | 0.2721 | | |
| 13 | 9.3000 | 2.0000 | 1.54 | 56.11 |

TABLE 19-continued

| Surface No. | Radius of Curvature R | Thickness T | Refractive Index Nd | Abbe Number Vd |
|---|---|---|---|---|
| 14 | −10.2313 | 1.0026 | | |
| 15 | Infinite | 0.5500 | 1.52 | 64.21 |
| 16 | Infinite | 1.9962 | | |
| 17 | Infinite | 0.4000 | 1.52 | 64.21 |
| 18 | Infinite | 0.2000 | | |
| IMA | Infinite | | | |

The present example employs seven lenses as an example. By properly distributing the refractive power and surface shape of each lens, the center thickness of each lens, and the air gap between the lenses, the lens assembly may have at least one of the beneficial effects of small front end aperture, miniaturization, high resolution, and ultra-large field of view.

Table 20 below shows the conic coefficient k and the high-order coefficients A、B、C、D and E applicable to aspheric surfaces S3-S6 and S10-14 in Example 7, wherein the surface type of each aspheric surface may be defined by the formula (1) given in the above Example 1.

TABLE 20

| Surface No. | K | A | B | C | D | E |
|---|---|---|---|---|---|---|
| 3 | −120.0000 | 9.0719E−04 | −1.9002E−05 | 7.5092E−07 | −2.7227E−08 | 6.5158E−10 |
| 4 | −1.3386 | 5.9715E−03 | 3.7850E−04 | 2.2685E−06 | 3.3608E−07 | 3.0604E−07 |
| 5 | 2.2546 | −5.5400E−03 | 4.1069E−04 | 1.6756E−05 | −2.9208E−06 | 1.0887E−06 |
| 6 | 5.4197 | −7.0322E−03 | 6.3452E−04 | −3.9466E−05 | 5.9219E−06 | −1.0475E−07 |
| 10 | −20.7513 | −4.0939E−03 | 3.0297E−04 | −7.4436E−05 | 4.6143E−05 | −1.0335E−05 |
| 11 | −1.0000 | −2.1695E−04 | 1.8742E−03 | −4.7320E−04 | 6.9285E−05 | −4.1979E−06 |
| 12 | −26.3752 | −6.3853E−03 | 6.5068E−04 | −3.7999E−05 | 3.2830E−06 | −1.7631E−07 |
| 13 | −16.8919 | −1.3623E−03 | 2.2548E−05 | 4.2354E−06 | 3.4189E−07 | −1.5655E−08 |
| 14 | 0.0000 | −9.4350E−04 | −5.0312E−05 | 5.2635E−06 | −5.8811E−07 | 3.6735E−08 |

Table 21 below shows a refractive index Nd1 of a material of the first lens L1 of the optical lens assembly, a maximum effective aperture D of the object-side surface S1 of the first lens L1 corresponding to a maximum field-of-view of the optical lens assembly, an image height 2h corresponding to the maximum field-of-view of the optical lens assembly, a maximum field-of-view FOV of the optical lens assembly, an optical back focus length BFL of the optical lens assembly (i.e. an axial distance from a center of the image-side surface S14 of the seventh lens L7, the last lens, to the imaging plane IMA), a total track length TTL of the optical lens assembly (i.e. an axial distance from a center of the object-side surface S1 of the first lens L1 to the imaging plane IMA), a total focal length F of the optical lens assembly and an air interval d2 between the first lens L1 and the second lens L2 in Example 7.

TABLE 21

| Nd1 | 1.78 | TTL (mm) | 24.4800 |
|---|---|---|---|
| D (mm) | 19.3597 | F (mm) | 2.1569 |
| h (mm) | 7.9520 | d2 (mm) | 3.1638 |
| FOV (°) | 196 | | |
| BFL (mm) | 4.1490 | | |

In the present example, the maximum field-of-view FOV of the optical lens assembly, the maximum effective aperture D of the object-side surface S1 of the first lens L1 corresponding to the maximum field-of-view of the optical lens assembly and the image height 2h corresponding to the maximum field-of-view of the optical lens assembly satisfy D/2h/FOV=0.0124; the optical back focus length BFL of the optical lens assembly and the total track length TTL of the optical lens assembly satisfy BFL/TTL=0.1695; the total track length TTL of the optical lens assembly, the maximum field-of-view FOV of the optical lens assembly and the image height 2h corresponding to the maximum field-of-view of the optical lens assembly satisfy TTL/2h/FOV=0.0157; the maximum field-of-view FOV of the optical lens assembly, the total focal length F of the optical lens assembly and the image height 2h corresponding to the maximum field-of-view of the optical lens assembly satisfy (FOV×F)/2h=53.1623; and the air interval d2 between the first lens L1 and the second lens L2 and the total track length TTL of the optical lens assembly satisfy d2/TTL=0.1292.

Example 8

Figure 8:
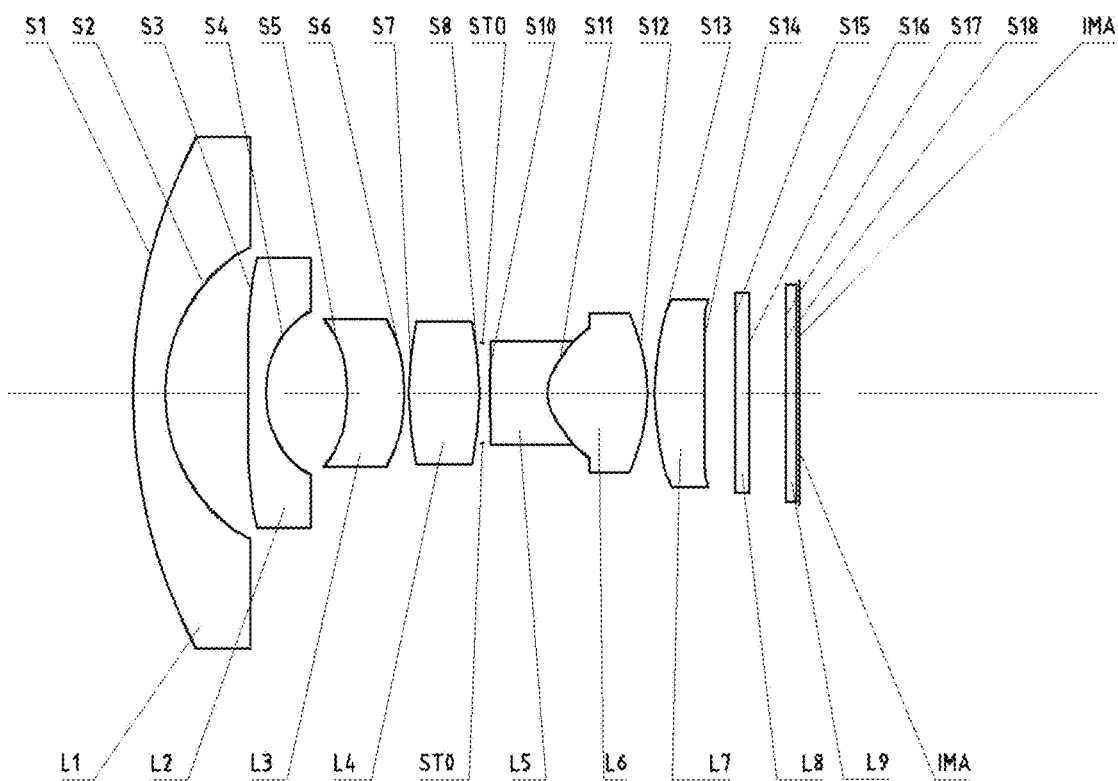
FIG. 8 illustrates a schematic structural view of an optical lens assembly according to Example 8 of the present disclosure.

An optical lens assembly according to Example 8 of the present disclosure is described below with reference to FIG. 8. FIG. 8 is a schematic structural view showing an optical lens assembly according to Example 8 of the present disclosure.

As shown in FIG. 8, the optical lens assembly includes a first lens L1, a second lens L2, a third lens L3, a fourth lens L4, a fifth lens L5, a sixth lens L6 and a seventh lens L7, sequentially from an object side to an image side along an optical axis.

The first lens L1 is a meniscus lens having a negative refractive power, an object-side surface S1 thereof is a convex surface, and an image-side surface S2 thereof is a concave surface. The second lens L2 is a biconcave lens having a negative refractive power, and both of an object-side surface S3 and an image-side surface S4 thereof are concave surfaces. The third lens L3 is a meniscus lens having a negative refractive power, an object-side surface S5 thereof is a concave surface, and an image-side surface S6 thereof is a convex surface. The fourth lens L4 is a biconvex lens having a positive refractive power, and both of an object-side surface S7 and an image-side surface S8 thereof are convex surfaces. The fifth lens L5 is a meniscus lens having a negative refractive power, an object-side surface S10 thereof is a convex surface, and an image-side surface S11 thereof is a concave surface. The sixth lens L6 is a biconvex lens having a positive refractive power, and both of an object-side surface S11 and an image-side surface S12 are convex surfaces. The fifth lens L5 and the sixth lens L6 are cemented together to form a cemented lens. The seventh lens L7 is a meniscus lens having a positive refractive power, an object-side surface S13 thereof is a convex surface, and an image-side surface S14 thereof is a concave surface.

Each of the second lens L2, the third lens L3, the fifth lens L5, the sixth lens L6 and the seventh lens L7 is an aspherical lens, and the respective object-side surface and image-side surface thereof are aspherical surfaces.

Optionally, the optical lens assembly may further include a optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 to improve image quality.

The present example employs seven lenses as an example. By properly distributing the refractive power and surface shape of each lens, the center thickness of each lens, and the air gap between the lenses, the lens assembly may have at least one of the beneficial effects of small front end aperture, miniaturization, high resolution, and ultra-large field of view.

Table 22 below shows radius of curvature R, thickness T, refractive index Nd, and Abbe number Vd of each lens of the optical lens assembly of Example 8, wherein the units of radius of curvature R and thickness T are both millimeters (mm). Table 23 below shows the conic coefficient k and the high-order coefficients A、B、C、D and E applicable to aspheric surfaces S3-S6 and S10-14 in Example 8, wherein the surface type of each aspheric surface may be defined by the formula (1) given in the above Example 1. Table 24 below shows a refractive index Nd1 of a material of the first lens L1 of the optical lens assembly, a maximum effective aperture D of the object-side surface S1 of the first lens L1 corresponding to a maximum field-of-view of the optical lens assembly, an image height 2h corresponding to the maximum field-of-view of the optical lens assembly, a maximum field-of-view FOV of the optical lens assembly, an optical back focus length BFL of the optical lens assembly (i.e. an axial distance from a center of the image-side surface S14 of the seventh lens L7, the last lens, to the imaging plane IMA), a total track length TTL of the optical lens assembly (i.e. an axial distance from a center of the object-side surface S1 of the first lens L1 to the imaging plane IMA), a total focal length F of the optical lens assembly and an air interval d2 between the first lens L1 and the second lens L2 in Example 8.

TABLE 22

| Surface No. | Radius of Curvature R | Thickness T | Refractive Index Nd | Abbe Number Vd |
|---|---|---|---|---|
| 1 | 18.5008 | 1.2600 | 1.78 | 49.61 |
| 2 | 5.8592 | 3.2384 | | |
| 3 | −187.07 | 0.7000 | 1.51 | 56.98 |
| 4 | 3.6970 | 3.1884 | | |
| 5 | −5.3519 | 2.2300 | 1.54 | 56.11 |
| 6 | −6.3387 | 0.1517 | | |
| 7 | 11.0187 | 2.8000 | 1.85 | 23.79 |
| 8 | −11.0187 | 0.0984 | | |
| STO | Infinite | 0.2845 | | |
| 10 | 15.8930 | 2.2500 | 1.64 | 23.53 |
| 11 | 1.2788 | 3.9510 | 1.52 | 56.11 |
| 12 | −5.5071 | 0.2729 | | |
| 13 | 9.3095 | 1.9420 | 1.53 | 56.11 |
| 14 | 55.2895 | 1.2064 | | |
| 15 | Infinite | 0.5500 | 1.52 | 64.21 |
| 16 | Infinite | 1.3530 | | |
| 17 | Infinite | 0.4000 | 1.52 | 64.21 |
| 18 | Infinite | 0.2000 | | |
| IMA | Infinite | | | |

表23

| Surface No. | K | A | B | C | D | E |
|---|---|---|---|---|---|---|
| 3 | 100.0000 | 1.0398E−03 | −1.9738E−05 | 6.9556E−07 | −2.4897E−08 | 3.3278E−10 |
| 4 | −1.8257 | 5.3680E−03 | 1.0405E−04 | 2.3410E−05 | −9.5314E−07 | 2.3354E−07 |
| 5 | 2.1739 | −2.6553E−03 | 2.3112E−04 | 5.1904E−06 | −2.0496E−06 | 4.3460E−07 |
| 6 | 0.2950 | −3.2079E−03 | 2.6614E−04 | −2.9186E−05 | 3.7586E−06 | −1.9287E−07 |
| 10 | −75.4200 | −5.6252E−03 | 1.3515E−03 | −4.4718E−04 | 9.0306E−05 | −7.6471E−06 |
| 11 | −1.6087 | −2.6063E−03 | 2.0418E−03 | −4.7481E−04 | 6.5525E−05 | −2.0285E−06 |
| 12 | −11.3200 | −6.8123E−03 | 7.5354E−04 | −6.2623E−05 | 3.4191E−06 | −4.4273E−10 |
| 13 | −3.3949 | −8.6463E−04 | 1.8401E−05 | 7.8144E−06 | 3.8484E−07 | −1.3099E−08 |
| 14 | −100.0000 | −1.9093E−03 | 1.0663E−04 | 6.0381E−06 | −1.7304E−07 | 3.2425E−08 |

表24

| Nd1 | 1.78 | TTL (mm) | 26.0767 |
|---|---|---|---|
| D (mm) | 18.4126 | F (mm) | 2.4840 |
| h (mm) | 7.8860 | d2 (mm) | 3.2384 |
| FOV (°) | 196 | | |
| BFL (mm) | 3.7094 | | |

In the present example, the maximum field-of-view FOV of the optical lens assembly, the maximum effective aperture D of the object-side surface S1 of the first lens L1 corresponding to the maximum field-of-view of the optical lens assembly and the image height 2h corresponding to the maximum field-of-view of the optical lens assembly satisfy D/2h/FOV=0.0119; the optical back focus length BFL of the optical lens assembly and the total track length TTL of the optical lens assembly satisfy BFL/TTL=0.1423; the total track length TTL of the optical lens assembly, the maximum field-of-view FOV of the optical lens assembly and the image height 2h corresponding to the maximum field-of-view of the optical lens assembly satisfy TTL/2h/FOV=0.0169; the maximum field-of-view FOV of the optical lens assembly, the total focal length F of the optical lens assembly and the image height 2h corresponding to the maximum field-of-view of the optical lens assembly satisfy (FOV×F)/2h=61.7373; and the air interval d2 between the first lens L1 and the second lens L2 and the total track length TTL of the optical lens assembly satisfy d2/TTL=0.1242.

Example 9

Figure 9:
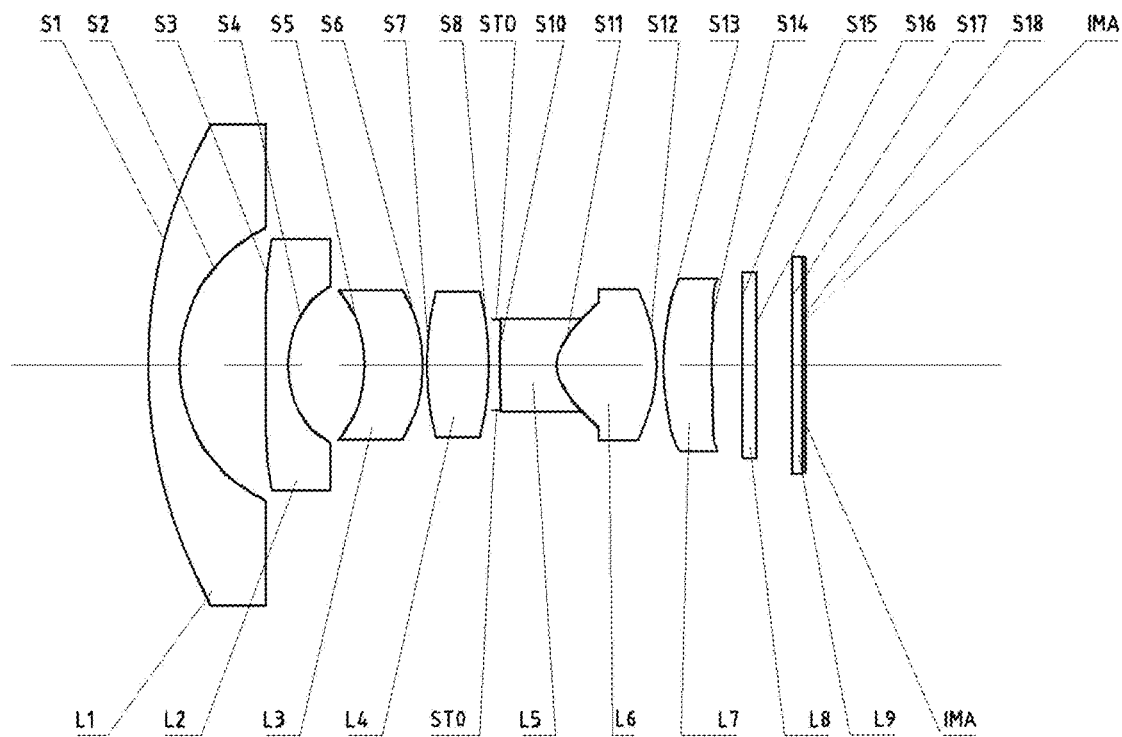
FIG. 9 illustrates a schematic structural view of an optical lens assembly according to Example 9 of the present disclosure.

An optical lens assembly according to Example 9 of the present disclosure is described below with reference to FIG. 9. FIG. 9 is a schematic structural view showing an optical lens assembly according to Example 9 of the present disclosure.

As shown in FIG. 9, the optical lens assembly includes a first lens L1, a second lens L2, a third lens L3, a fourth lens L4, a fifth lens L5, a sixth lens L6 and a seventh lens L7, sequentially from an object side to an image side along an optical axis.

The first lens L1 is a meniscus lens having a negative refractive power, an object-side surface S1 thereof is a convex surface, and an image-side surface S2 thereof is a concave surface. The second lens L2 is a biconcave lens having a negative refractive power, and both of an object-side surface S3 and an image-side surface S4 thereof are concave surfaces. The third lens L3 is a meniscus lens having a negative refractive power, an object-side surface S5 thereof is a concave surface, and an image-side surface S6 thereof is a convex surface. The fourth lens L4 is a biconvex lens having a positive refractive power, and both of an object-side surface S7 and an image-side surface S8 thereof are convex surfaces. The fifth lens L5 is a meniscus lens having a negative refractive power, an object-side surface S10 thereof is a convex surface, and an image-side surface S11 thereof is a concave surface. The sixth lens L6 is a biconvex lens having a positive refractive power, and both of an object-side surface S11 and an image-side surface S12 are convex surfaces. The fifth lens L5 and the sixth lens L6 are cemented together to form a cemented lens. The seventh lens L7 is a meniscus lens having a positive refractive power, an object-side surface S13 thereof is a convex surface, and an image-side surface S14 thereof is a concave surface.

Each of the second lens L2, the third lens L3, the fifth lens L5, the sixth lens L6 and the seventh lens L7 is an aspherical lens, and the respective object-side surface and image-side surface thereof are aspherical surfaces.

Optionally, the optical lens assembly may further include a optical filter L8 having an object-side surface S15 and an image-side surface S16 and a protective lens L9 having an object-side surface S17 and an image-side surface S18. The optical filter L8 may be used to correct color deviations. The protective lens L9 may be used to protect an image sensor chip located on an imaging plane IMA. Light from an object sequentially passes through the surfaces S1 to S18 and is finally imaged on the imaging plane IMA.

In the optical lens assembly of the present example, a stop STO may be disposed between the fourth lens L4 and the fifth lens L5 to improve image quality.

The present example employs seven lenses as an example. By properly distributing the refractive power and surface shape of each lens, the center thickness of each lens, and the air gap between the lenses, the lens assembly may have at least one of the beneficial effects of small front end aperture, miniaturization, high resolution, and ultra-large field of view.

Table 25 below shows radius of curvature R, thickness T, refractive index Nd, and Abbe number Vd of each lens of the optical lens assembly of Example 9, wherein the units of radius of curvature R and thickness T are both millimeters (mm). Table 26 below shows the conic coefficient k and the high-order coefficients A、B、C、D and E applicable to aspheric surfaces S3-S6 and S10-14 in Example 9, wherein the surface type of each aspheric surface may be defined by the formula (1) given in the above Example 1. Table 27 below shows a refractive index Nd1 of a material of the first lens L1 of the optical lens assembly, a maximum effective aperture D of the object-side surface S1 of the first lens L1 corresponding to a maximum field-of-view of the optical lens assembly, an image height 2h corresponding to the maximum field-of-view of the optical lens assembly, a maximum field-of-view FOV of the optical lens assembly, an optical back focus length BFL of the optical lens assembly (i.e. an axial distance from a center of the image-side surface S14 of the seventh lens L7, the last lens, to the imaging plane IMA), a total track length TTL of the optical lens assembly (i.e. an axial distance from a center of the object-side surface S1 of the first lens L1 to the imaging plane IMA), a total focal length F of the optical lens assembly and an air interval d2 between the first lens L1 and the second lens L2 in Example 9.

TABLE 25

| Surface No. | Radius of Curvature R | Thickness T | Refractive Index Nd | Abbe Number Vd |
|---|---|---|---|---|
| 1 | 18.2576 | 1.2500 | 1.80 | 49.62 |
| 2 | 5.6893 | 3.4220 | | |
| 3 | −82.33 | 0.8500 | 1.51 | 56.98 |
| 4 | 3.9652 | 3.0229 | | |
| 5 | −5.3459 | 2.3000 | 1.54 | 56.11 |
| 6 | −6.3302 | 0.1509 | | |
| 7 | 11.1044 | 2.4800 | 1.86 | 24.79 |
| 8 | −11.1044 | 0.2979 | | |
| STO | Infinite | 0.1130 | | |
| 10 | 15.1194 | 2.2500 | 1.64 | 23.53 |
| 11 | 1.2514 | 3.9600 | 1.53 | 56.11 |
| 12 | −5.3924 | 0.2714 | | |
| 13 | 9.2946 | 1.9300 | 1.54 | 56.11 |
| 14 | 34.6122 | 1.2000 | | |
| 15 | Infinite | 0.5500 | 1.52 | 64.21 |
| 16 | Infinite | 1.3442 | | |
| 17 | Infinite | 0.4000 | 1.52 | 64.21 |
| 18 | Infinite | 0.2000 | | |
| IMA | Infinite | | | |

TABLE 26

| Surface No. | K | A | B | C | D | E |
|---|---|---|---|---|---|---|
| 3 | 99.8929 | 1.0440E−03 | −1.8063E−05 | 7.2351E−07 | −2.8754E−08 | 2.6814E−10 |
| 4 | −1.8257 | 4.9658E−03 | 1.4236E−04 | 2.4272E−05 | −3.4668E−06 | 4.3339E−07 |
| 5 | 1.9739 | −2.6444E−03 | 2.7604E−04 | 1.0090E−05 | −2.9035E−06 | 4.1833E−07 |
| 6 | 0.3950 | −3.4684E−03 | 3.3252E−04 | −3.2779E−05 | 3.3806E−06 | −1.6788E−07 |
| 10 | −87.1001 | −5.6492E−03 | 1.2478E−03 | −4.4353E−04 | 1.1500E−04 | −1.3375E−05 |
| 11 | −1.6490 | −1.8266E−03 | 1.8675E−03 | −5.2627E−04 | 8.9241E−05 | −6.1024E−06 |
| 12 | −11.0217 | −6.9034E−03 | 7.8786E−04 | −6.4476E−05 | 3.8258E−06 | −1.4232E−07 |
| 13 | −2.3949 | −1.0842E−03 | 2.5877E−05 | 1.0673E−05 | 4.2935E−07 | −3.1761E−08 |
| 14 | −100.0000 | −2.1314E−03 | 1.2265E−04 | 7.4357E−06 | −2.3808E−07 | 6.8168E−08 |

TABLE 27

| Nd1 | 1.80 | TTL (mm) | 25.9922 |
|---|---|---|---|
| D (mm) | 18.3567 | F (mm) | 2.4200 |
| h (mm) | 7.8880 | d2 (mm) | 3.4220 |
| FOV (°) | 196 | | |
| BFL (mm) | 3.6942 | | |

In the present example, the maximum field-of-view FOV of the optical lens assembly, the maximum effective aperture D of the object-side surface S1 of the first lens L1 corresponding to the maximum field-of-view of the optical lens assembly and the image height 2h corresponding to the maximum field-of-view of the optical lens assembly satisfy D/2h/FOV=0.0119; the optical back focus length BFL of the optical lens assembly and the total track length TTL of the optical lens assembly satisfy BFL/TTL=0.1421; the total track length TTL of the optical lens assembly, the maximum field-of-view FOV of the optical lens assembly and the image height 2h corresponding to the maximum field-of-view of the optical lens assembly satisfy TTL/2h/FOV=0.0168; the maximum field-of-view FOV of the optical lens assembly, the total focal length F of the optical lens assembly and the image height 2h corresponding to the maximum field-of-view of the optical lens assembly satisfy (FOV×F)/2h=60.1309; and the air interval d2 between the first lens L1 and the second lens L2 and the total track length TTL of the optical lens assembly satisfy d2/TTL=0.1317.

Example 10

Figure 10:
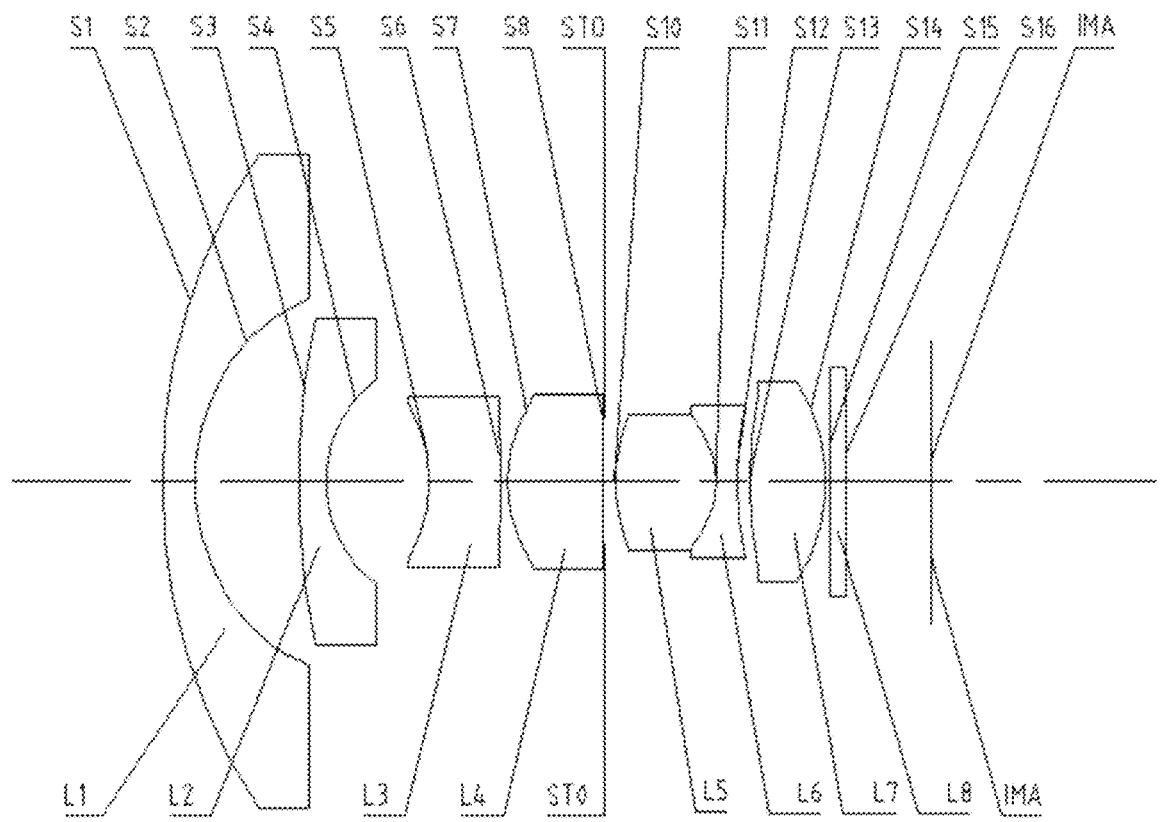
FIG. 10 illustrates a schematic structural view of an optical lens assembly according to Example 10 of the present disclosure.

An optical lens assembly according to Example 10 of the present disclosure is described below with reference to FIG. 10. FIG. 10 is a schematic structural view showing an optical lens assembly according to Example 10 of the present disclosure.

As shown in FIG. 10, the optical lens assembly includes a first lens L1, a second lens L2, a third lens L3, a fourth lens L4, a fifth lens L5, a sixth lens L6 and a seventh lens L7, sequentially from an object side to an image side along an optical axis.

The first lens L1 is a meniscus lens having a negative refractive power, an object-side surface S1 thereof is a convex surface, and an image-side surface S2 thereof is a concave surface. The second lens L2 is a meniscus lens having a negative refractive power, an object-side surface S3 thereof is a convex surface, and an image-side surface S4 thereof is a concave surface. The third lens L3 is a meniscus lens having a negative refractive power, an object-side surface S5 thereof is a concave surface, and an image-side surface S6 thereof is a convex surface. The fourth lens L4 is a biconvex lens having a positive refractive power, and both of an object-side surface S7 and an image-side surface S8 thereof are convex surfaces. The fifth lens L5 is a biconvex lens having a positive refractive power, and both of an object-side surface S10 and an image-side surface S11 thereof are convex surfaces. The sixth lens L6 is a biconcave lens having a negative refractive power, and both of an object-side surface S11 and an image-side surface S12 thereof are concave surfaces. The fifth lens L5 and the sixth lens L6 are cemented together to form a cemented lens. The seventh lens L7 is a biconvex lens having a positive refractive power, and both of an object-side surface S13 and an image-side surface S14 thereof are convex surfaces.

In addition, each of the third lens L3, the fourth lens L4 and the seventh lens L7 is an aspherical lens, and the respective object-side surface and image-side surface thereof are aspherical surfaces.

Optionally, the optical lens assembly may further include a optical filter L8 and/or a protective lens L8' having an object-side surface S15 and an image-side surface S16. The optical filter L8 may be used to correct color deviations. The protective lens L8' may be used to protect an image sensor chip located on an imaging plane IMA. Light from an object sequentially passes through the surfaces S1 to S16 and is finally imaged on the imaging plane IMA.

In the optical lens assembly of the present example, a stop STO may be disposed between the fourth lens L4 and the fifth lens L5 to improve image quality.

Table 28 shows radius of curvature R, thickness T, refractive index Nd, and Abbe number Vd of each lens of the optical lens assembly of Example 10, wherein the units of radius of curvature R and thickness T are both millimeters (mm).

TABLE 28

| Surface No. | Radius of Curvature R | Thickness T | Refractive Index Nd | Abbe Number Vd |
|---|---|---|---|---|
| 1 | 16.0800 | 1.1000 | 1.77 | 49.61 |
| 2 | 5.8080 | 3.4645 | | |
| 3 | 21.2900 | 0.9200 | 1.69 | 55.57 |
| 4 | 3.4840 | 3.4810 | | |
| 5 | −4.3273 | 2.3900 | 1.59 | 61.12 |
| 6 | −70.4100 | 0.2500 | | |
| 7 | 4.1000 | 3.2320 | 1.74 | 49.36 |
| 8 | −21.6971 | 0.0181 | | |
| STO | Infinite | 0.3509 | | |
| 10 | 4.3730 | 3.4100 | 1.50 | 81.59 |
| 11 | −2.7057 | 0.7100 | 1.77 | 25.62 |
| 12 | 8.8400 | 0.4208 | | |
| 13 | 7.4830 | 2.5500 | 1.56 | 61.12 |
| 14 | −4.6658 | 0.1481 | | |
| 15 | Infinite | 0.5500 | 1.52 | 64.21 |
| 16 | Infinite | 2.8222 | | |
| IMA | Infinite | | | |

The present example employs seven lenses as an example. By properly distributing the refractive power and surface shape of each lens, the center thickness of each lens, and the air gap between the lenses, the lens assembly may have at least one of the beneficial effects of high resolution, miniaturization, large angle resolution, stable temperature performance, small effective aperture radius, and low cost.

Table 29 below shows the conic coefficient k and the high-order coefficients A、B、C、D and E applicable to aspheric surfaces S5-S8 and S13-14 in Example 10, wherein the surface type of each aspheric surface may be defined by the formula (1) given in the above Example 1.

TABLE 29

| Surface No. | K | A | B | C | D | E |
|---|---|---|---|---|---|---|
| 5 | −7.2000 | −8.2445E−03 | 8.5747E−04 | −9.6265E−05 | 7.2569E−06 | −1.7582E−06 |
| 6 | 182.2000 | −3.9478E−04 | 1.9495E−05 | 6.4909E−06 | −5.2342E−07 | 3.4039E−08 |
| 7 | −0.6500 | 1.4043E−04 | 1.2451E−04 | 8.1853E−06 | −9.1393E−07 | 1.1089E−07 |
| 8 | −200.0000 | 1.3994E−03 | 4.7349E−04 | −1.9176E−05 | 8.6092E−07 | 1.0239E−06 |
| 13 | −8.0877 | −2.1965E−03 | 8.4767E−05 | 2.6707E−05 | −4.0491E−06 | 2.0031E−07 |
| 14 | 0.0193 | 7.4617E−04 | −9.8830E−05 | 3.5837E−05 | −4.5496E−06 | 2.8535E−07 |

Table 30 below shows a maximum effective aperture D of the object-side surface S1 of the first lens L1 corresponding to a maximum field-of-view of the optical lens assembly, an image height 2h corresponding to the maximum field-of-view of the optical lens assembly, a maximum field-of-view FOV of the optical lens assembly, an optical back focus length BFL of the optical lens assembly (i.e. an axial distance from a center of the image-side surface S14 of the seventh lens L7, the last lens, to the imaging plane IMA), a total track length TTL of the optical lens assembly (i.e. an axial distance from a center of the object-side surface S1 of the first lens L1 to the imaging plane IMA), a total focal length F of the optical lens assembly, a focal length F2 of the second lens L2, a focal length F3 of the third lens L3, a combined focal length F56 of the fifth lens L5 and the sixth lens L6, a focal length F7 of the seventh lens L7, an air interval d12 between the sixth lens L6 and the seventh lens L7, and a refractive index Nd1 of a material of the first lens L1 in Example 10.

TABLE 30

| D (mm) | 19.3953 | F3 (mm) | −7.8935 |
|---|---|---|---|
| h (mm) | 7.9980 | F56 (mm) | −38.6484 |
| FOV (°) | 211 | F7 (mm) | 5.5318 |
| BFL (mm) | 3.5203 | d12 (mm) | 0.4208 |
| TTL (mm) | 25.8175 | Nd1 (mm) | 1.77 |
| F (mm) | 2.2476 | | |
| F2 (mm) | −6.1440 | | |

In the present example, the maximum field-of-view FOV of the optical lens assembly, the maximum effective aperture D of the object-side surface S1 of the first lens L1 corresponding to the maximum field-of-view of the optical lens assembly and the image height 2h corresponding to the maximum field-of-view of the optical lens assembly satisfy D/2h/FOV=0.0115; the optical back focus length BFL of the optical lens assembly and the total track length TTL of the optical lens assembly satisfy BFL/TTL=0.1416; the total track length TTL of the optical lens assembly, the maximum field-of-view FOV of the optical lens assembly and the image height 2h corresponding to the maximum field-of-view of the optical lens assembly satisfy TTL/2h/FOV=0.0153; the maximum field-of-view FOV of the optical lens assembly, the total focal length F of the optical lens assembly and the image height 2h corresponding to the maximum field-of-view of the optical lens assembly satisfy (FOV×F)/2h=59.2942; the focal length F2 of the second lens L2 and the focal length F3 of the third lens L3 satisfy F3/F2=1.2847; the combined focal length F56 of the fifth lens L5 and the sixth lens L6 and the total focal length F of the optical lens assembly satisfy F56/F=−17.1957; the focal length F7 of the seventh lens L7 and the total focal length F of the optical lens assembly satisfy F7/F=2.4612; and the air interval d12 between the sixth lens L6 and the seventh lens L7 and the total track length TTL of the optical lens assembly satisfy d12/TTL=0.0163.

Example 11

Figure 11:
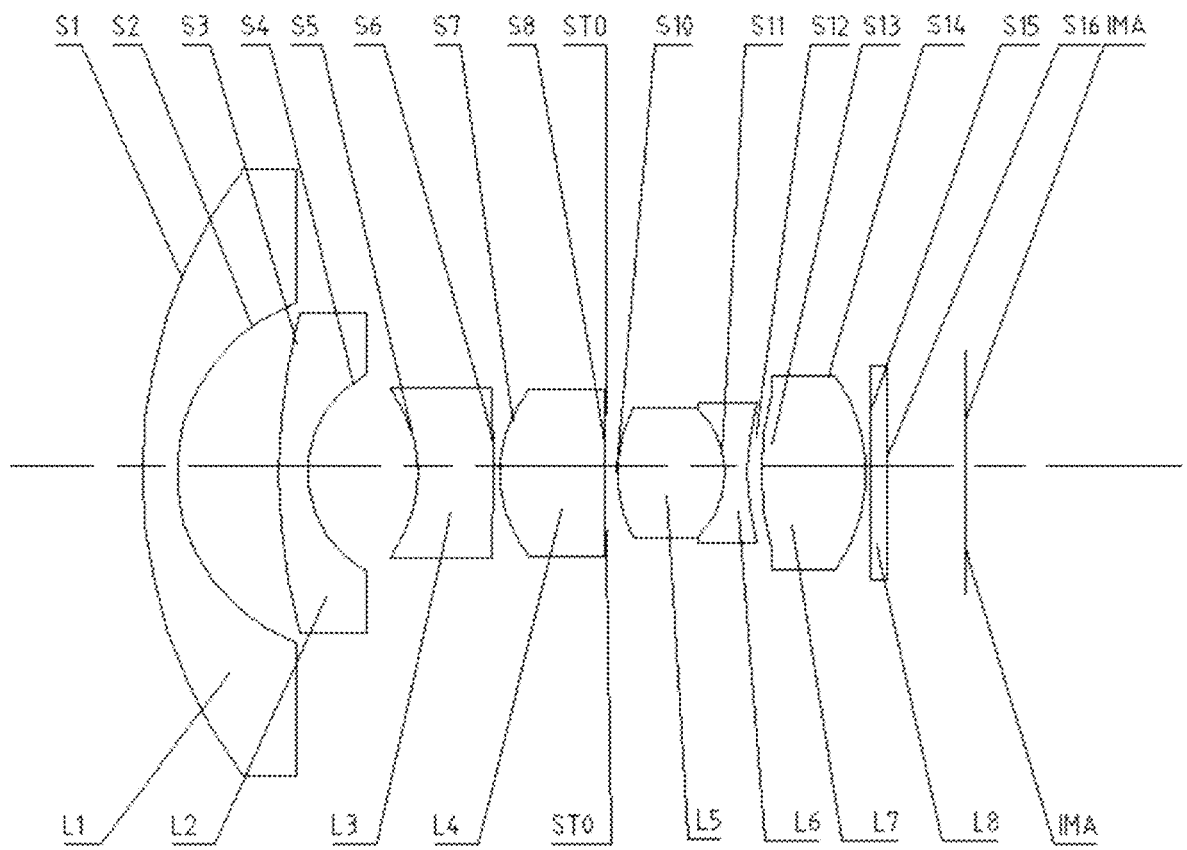
FIG. 11 illustrates a schematic structural view of an optical lens assembly according to Example 11 of the present disclosure.

An optical lens assembly according to Example 11 of the present disclosure is described below with reference to FIG. 11. FIG. 11 is a schematic structural view showing an optical lens assembly according to Example 11 of the present disclosure.

As shown in FIG. 11, the optical lens assembly includes a first lens L1, a second lens L2, a third lens L3, a fourth lens L4, a fifth lens L5, a sixth lens L6 and a seventh lens L7, sequentially from an object side to an image side along an optical axis.

The first lens L1 is a meniscus lens having a negative refractive power, an object-side surface S1 thereof is a convex surface, and an image-side surface S2 thereof is a concave surface. The second lens L2 is a meniscus lens having a negative refractive power, an object-side surface S3 thereof is a convex surface, and an image-side surface S4 thereof is a concave surface. The third lens L3 is a meniscus lens having a negative refractive power, an object-side surface S5 thereof is a concave surface, and an image-side surface S6 thereof is a convex surface. The fourth lens L4 is a biconvex lens having a positive refractive power, and both of an object-side surface S7 and an image-side surface S8 thereof are convex surfaces. The fifth lens L5 is a biconvex lens having a positive refractive power, and both of an object-side surface S10 and an image-side surface S11 thereof are convex surfaces. The sixth lens L6 is a biconcave lens having a negative refractive power, and both of an object-side surface S11 and an image-side surface S12 thereof are concave surfaces. The fifth lens L5 and the sixth lens L6 are cemented together to form a cemented lens. The seventh lens L7 is a biconvex lens having a positive refractive power, and both of an object-side surface S13 and an image-side surface S14 thereof are convex surfaces.

In addition, each of the third lens L3, the fourth lens L4 and the seventh lens L7 is an aspherical lens, and the respective object-side surface and image-side surface thereof are aspherical surfaces.

Optionally, the optical lens assembly may further include a optical filter L8 and/or a protective lens L8' having an object-side surface S15 and an image-side surface S16. The optical filter L8 may be used to correct color deviations. The protective lens L8' may be used to protect an image sensor chip located on an imaging plane IMA. Light from an object sequentially passes through the surfaces S1 to S16 and is finally imaged on the imaging plane IMA.

In the optical lens assembly of the present example, a stop STO may be disposed between the fourth lens L4 and the fifth lens L5 to improve image quality.

The present example employs seven lenses as an example. By properly distributing the refractive power and surface shape of each lens, the center thickness of each lens, and the air gap between the lenses, the lens assembly may have at least one of the beneficial effects of high resolution, miniaturization, large angle resolution, stable temperature performance, small effective aperture radius, and low cost.

Table 31 shows radius of curvature R, thickness T, refractive index Nd, and Abbe number Vd of each lens of the optical lens assembly of Example 11, wherein the units of radius of curvature R and thickness T are both millimeters (mm). Table 32 below shows the conic coefficient k and the high-order coefficients A、B、C、D and E applicable to aspheric surfaces S5-S8 and S13-14 in Example 11, wherein the surface type of each aspheric surface may be defined by the formula (1) given in the above Example 1. Table 33 below shows a maximum effective aperture D of the object-side surface S1 of the first lens L1 corresponding to a maximum field-of-view of the optical lens assembly, an image height 2h corresponding to the maximum field-of-view of the optical lens assembly, a maximum field-of-view FOV of the optical lens assembly, an optical back focus length BFL of the optical lens assembly, a total track length TTL of the optical lens assembly, a total focal length F of the optical lens assembly, a focal length F2 of the second lens L2, a focal length F3 of the third lens L3, a combined focal length F56 of the fifth lens L5 and the sixth lens L6, a focal length F7 of the seventh lens L7, an air interval d12 between the sixth lens L6 and the seventh lens L7, and a refractive index Nd1 of a material of the first lens L1 in Example 11.

TABLE 31

| Surface No. | Radius of Curvature R | Thickness T | Refractive Index Nd | Abbe Number Vd |
| --- | --- | --- | --- | --- |
| 1 | 16.4000 | 1.1000 | 1.77 | 49.63 |
| 2 | 5.8127 | 3.3023 | | |
| 3 | 19.7800 | 0.9100 | 1.69 | 54.57 |
| 4 | 3.5797 | 3.5856 | | |
| 5 | −4.2688 | 2.4200 | 1.59 | 61.16 |
| 6 | −70.0000 | 0.1791 | | |
| 7 | 4.1875 | 3.4500 | 1.74 | 49.34 |
| 8 | −22.5930 | 0.0181 | | |
| STO | Infinite | 0.3509 | | |
| 10 | 4.3731 | 3.4700 | 1.50 | 81.59 |
| 11 | −2.8900 | 0.7100 | 1.77 | 25.72 |
| 12 | 8.7000 | 0.4652 | | |
| 13 | 7.5602 | 3.3720 | 1.59 | 61.16 |
| 14 | −4.7302 | 0.1481 | | |
| 15 | Infinite | 0.5500 | 1.52 | 64.21 |
| 16 | Infinite | 2.4812 | | |
| IMA | Infinite | | | |

TABLE 32

| Surface No. | K | A | B | C | D | E |
| --- | --- | --- | --- | --- | --- | --- |
| 5 | −6.3000 | −8.2994E−03 | 8.6621E−04 | −9.7719E−05 | 6.9255E−06 | −1.5023E−07 |
| 6 | 180.0000 | −4.4028E−04 | 2.1103E−05 | 7.4236E−06 | −5.2422E−07 | 4.8998E−08 |
| 7 | −0.6592 | 5.8640E−05 | 1.2611E−04 | 8.3465E−06 | −9.7213E−07 | 3.6970E−10 |
| 8 | −150.0000 | 1.4356E−03 | 4.5836E−04 | −2.0429E−05 | 1.9197E−06 | 9.9586E−07 |
| 13 | −5.2200 | −1.9882E−03 | 1.1805E−04 | 3.0623E−05 | −4.3412E−06 | 2.5980E−07 |
| 14 | −0.1607 | 1.1039E−03 | −9.5380E−05 | 3.5686E−05 | −3.7931E−06 | 1.6879E−07 |

TABLE 33

| D (mm) | 19.6014 | F3 (mm) | −7.7932 |
| --- | --- | --- | --- |
| h (mm) | 8.1460 | F56 (mm) | −51.3516 |
| FOV (°) | 211 | F7 (mm) | 5.4708 |
| BFL (mm) | 3.1793 | d12 (mm) | 0.4652 |
| TTL (mm) | 26.5124 | Nd1 (mm) | 1.77 |
| F (mm) | 2.2959 | | |
| F2 (mm) | −6.4357 | | |

In the present example, the maximum field-of-view FOV of the optical lens assembly, the maximum effective aperture D of the object-side surface S1 of the first lens L1 corresponding to the maximum field-of-view of the optical lens assembly and the image height 2h corresponding to the maximum field-of-view of the optical lens assembly satisfy D/2h/FOV=0.0114; the optical back focus length BFL of the optical lens assembly and the total track length TTL of the optical lens assembly satisfy BFL/TTL=0.1199; the total track length TTL of the optical lens assembly, the maximum field-of-view FOV of the optical lens assembly and the image height 2h corresponding to the maximum field-of-view of the optical lens assembly satisfy TTL/2h/FOV=0.0154; the maximum field-of-view FOV of the optical lens assembly, the total focal length F of the optical lens assembly and the image height 2h corresponding to the maximum field-of-view of the optical lens assembly satisfy (FOV×F)/2h=59.4691; the focal length F2 of the second lens L2 and the focal length F3 of the third lens L3 satisfy F3/F2=1.2109; the combined focal length F56 of the fifth lens L5 and the sixth lens L6 and the total focal length F of the optical lens assembly satisfy F56/F=−22.3667; the focal length F7 of the seventh lens L7 and the total focal length F of the optical lens assembly satisfy F7/F=2.3829; and the air interval d12 between the sixth lens L6 and the seventh lens L7 and the total track length TTL of the optical lens assembly satisfy d12/TTL=0.0175.

In view of the above, Examples 1 to 11 respectively satisfy the relationship shown in Table 34.

TABLE 34

| Condition | Example 1 | 2 | 3 | 4 | 5 | 6 |
|---|---|---|---|---|---|---|
| (|r31| + d3)/|r32| | 5.944 | 0.646 | 0.163 | 0.224 | 0.202 | 0.045 |
| (|r41| + d4)/|r42| | 0.303 | 0.112 | 0.249 | 0.533 | 0.645 | 0.525 |
| D/h/FOV | 0.014 | 0.013 | 0.012 | 0.014 | 0.015 | 0.014 |
| BFL/TTL | 0.195 | 0.187 | 0.146 | 0.170 | 0.166 | 0.147 |
| TTL/h/FOV | 0.019 | 0.018 | 0.015 | 0.019 | 0.017 | 0.017 |
| (FOV × F)/h | 56.9896 | 58.1949 | 55.6499 | 55.4457 | 44.8255 | 60.3090 |
| d2/TTL | 0.1515 | 0.1254 | 0.1429 | 0.1043 | 0.1510 | 0.1426 |
| d12/TTL | 0.0289 | 0.0279 | 0.0286 | 0.0067 | 0.0075 | 0.0286 |
| F3/F2 | 1.9820 | 1.6742 | 1.3188 | 2.4790 | 2.2680 | 1.6839 |
| F56/F | 8.7804 | 6.2999 | 5.3543 | 5.9137 | 6.2813 | 5.1904 |
| F7/F | 2.4383 | 2.4235 | 2.2695 | −7.3430 | −7.2570 | −4.1768 |

| Condition | Example 7 | 8 | 9 | 10 | 11 |
|---|---|---|---|---|---|
| (|r31| + d3)/|r32| | 0.6345 | 1.1961 | 1.2078 | 0.0954 | 0.0956 |
| (|r41| + d4)/|r42| | 1.277 | 1.254 | 1.223 | 0.338 | 0.338 |
| D/h/FOV | 0.0124 | 0.0119 | 0.0119 | 0.0115 | 0.0114 |
| BFL/TTL | 0.1695 | 0.1423 | 0.1421 | 0.1364 | 0.1199 |
| TTL/h/FOV | 0.0157 | 0.0169 | 0.0168 | 0.0153 | 0.0154 |
| (FOV × F)/h | 53.1630 | 61.7378 | 60.1318 | 59.2953 | 59.4691 |
| d2/TTL | 0.1292 | 0.1242 | 0.1317 | 0.1342 | 0.1246 |
| d12/TTL | 0.0111 | 0.0105 | 0.0104 | 0.0163 | 0.0175 |
| F3/F2 | 4.0200 | 43.2703 | 48.2978 | 1.2847 | 1.2109 |
| F56/F | −54.6292 | −7.9576 | −8.8597 | −17.1957 | −22.3667 |
| F7/F | 4.3500 | 8.3485 | 9.4967 | 2.4612 | 2.3829 |

The present disclosure further provides an imaging device, which may include an optical lens assembly according to some of the above-mentioned embodiments of the present disclosure and an imaging element for converting an optical image formed by the optical lens assembly into an electrical signal. The imaging element may be a photosensitive charge-coupled device (CCD) or complementary metal-oxide semiconductor (CMOS). The imaging device may be a separate imaging device such as a range detection camera, or an imaging module integrated on a device such as range detection device.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens assembly, comprising: a first lens, a second lens, a third lens, a fourth lens, a fifth lens, a sixth lens and a seventh lens, which are sequentially arranged from an object side of the optical lens assembly to an image side of the optical lens assembly along an optical axis of the optical lens assembly, wherein, the first lens has a negative refractive power, an object-side surface of the first lens is a convex surface, and an image-side surface of the first lens is a concave surface;

the second lens has a negative refractive power, and an image-side surface of the second lens is a concave surface;

the third lens has a negative refractive power;

the fourth lens has a positive refractive power, and an object-side surface of the fourth lens is a convex surface;

an object-side surface of the fifth lens is a convex surface; and the seventh lens has a positive refractive power, and an object-side surface of the seventh lens is a convex surface;

wherein the optical lens assembly satisfies:

$0.0104 \leq d12/TTL \leq 0.035$, $0.015/\text{degree} \leq TTL/2h/\text{FOV} \leq 0.025/\text{degree}$, $0.1043 \leq d2/TTL \leq 0.2$, and $BFL/TTL \geq 0.1199$, where d12 is an air interval between the sixth lens and the seventh lens, 2h is an image height corresponding to a maximum field-of-view of the optical lens assembly, FOV is the maximum field-of-view of the optical lens assembly, d2 is an air interval between the first lens and the second lens, BFL is a distance on the optical axis from a center of an image-side surface of the seventh lens to the imaging plane of the optical lens assembly, and TTL is the distance on the optical axis from the center of the object-side surface of the first lens to the imaging plane of the optical lens assembly.

2. The optical lens assembly according to claim 1, wherein both of an object-side surface and an image-side surface of the third lens are concave surfaces; or
   an object-side surface of the third lens is a convex surface, and an image-side surface of the third lens is a concave surface; or
   an object-side surface of the third lens is a concave surface, and an image-side surface of the third lens is a convex surface.

3. The optical lens assembly according to claim 1, wherein both of the object-side surface and an image-side surface of the fourth lens are convex surfaces; or
   the object-side surface of the fourth lens is a convex surface, and an image-side surface of the fourth lens is a concave surface.

4. The optical lens assembly according to claim 1, wherein the fifth lens has a positive refractive power, and both of the object-side surface and an image-side surface of the fifth lens are convex surfaces, and the sixth lens has a negative refractive power, and both of an object-side surface and an image-side surface of the sixth lens are concave surfaces; or
   the fifth lens has a negative refractive power, the object-side surface of the fifth lens is a convex surface and an image-side surface of the fifth lens is a concave surface, and the sixth lens has a positive refractive power, and both of an object-side surface and an image-side surface of the sixth lens are convex surfaces.

5. The optical lens assembly according to claim 1, wherein at least three lenses among the second lens to the seventh lens are aspherical lenses.

6. The optical lens assembly according to claim 1, wherein the optical lens assembly satisfies:

$D/2h/FOV \leq 0.025/\text{degree}$, where

D is a maximum effective aperture of the object-side surface of the first lens corresponding to the maximum field-of-view of the optical lens assembly.

7. The optical lens assembly according to claim 1, wherein the optical lens assembly satisfies: $(FOV \times F)/2h \geq 45°$,
   where F is a total focal length of the optical lens assembly.

8. The optical lens assembly according to claim 1, wherein a focal length F7 of the seventh lens and a total focal length F of the optical lens assembly satisfy: $F7/F \leq 3$.

9. The optical lens assembly according to claim 1, wherein the optical lens assembly satisfies:

$(|r31|+d3)/|r32| \leq 12$, where
   r31 is a radius of curvature of the object-side surface of the third lens,
   r32 is a radius of curvature of an image-side surface of the third lens,
   d3 is a center thickness of the third lens.

10. An imaging device, wherein the imaging device comprises the optical lens assembly of claim 1 and an imaging element for converting an optical image formed by the optical lens assembly into an electrical signal.

11. The optical lens assembly according to claim 1, wherein the optical lens assembly satisfies:

$0.166 \leq BFL/TTL$.

12. The optical lens assembly according to claim 11, wherein the optical lens assembly satisfies:

$0.166 \leq BFL/TTL \leq 0.195$.

13. The optical lens assembly according to claim 6, wherein the optical lens assembly satisfies:

$0.014/\text{degree} \leq D/2h/FOV \leq 0.025/\text{degree}$.

14. The optical lens assembly according to claim 1, wherein the optical lens assembly satisfies:

$0.0104 \leq d12/TTL \leq 0.0289$.

15. The optical lens assembly according to claim 1, wherein the optical lens assembly satisfies:

$0.0111 \leq d12/TTL \leq 0.035$.

16. The optical lens assembly according to claim 15, wherein the optical lens assembly satisfies:

$0.0111 \leq d12/TTL \leq 0.0289$.

17. The optical lens assembly according to claim 9, wherein the optical lens assembly satisfies:

$(|r31|+d3)/|r32| \leq 0.646$.

18. The optical lens assembly according to claim 7, wherein the optical lens assembly satisfies:

$61.7378° \geq (FOV \times F)/2h \geq 45°$.

* * * * *